US010867730B2

(12) United States Patent
Matthiesen

(10) Patent No.: US 10,867,730 B2
(45) Date of Patent: *Dec. 15, 2020

(54) TRANSFORMATION ENABLED NITRIDE MAGNETS ABSENT RARE EARTHS AND A PROCESS OF MAKING THE SAME

(71) Applicant: Case Western Reserve University, Cleveland, OH (US)

(72) Inventor: David Matthiesen, Cleveland, OH (US)

(73) Assignee: Case Western Reserve University, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/974,517

(22) Filed: May 8, 2018

(65) Prior Publication Data

US 2018/0301259 A1 Oct. 18, 2018

Related U.S. Application Data

(63) Continuation-in-part of application No. 14/304,102, filed on Jun. 13, 2014, now Pat. No. 9,997,285, which
(Continued)

(51) Int. Cl.
*H01F 1/24* (2006.01)
*H01F 41/02* (2006.01)
(Continued)

(52) U.S. Cl.
CPC .................. *H01F 1/24* (2013.01); *B22F 1/02* (2013.01); *C01B 21/0622* (2013.01);
(Continued)

(58) Field of Classification Search
CPC ........ H01F 1/24; H01F 41/0266; H01F 1/065; H01F 1/083; C23C 8/26; C23C 8/80;
(Continued)

(56) References Cited

U.S. PATENT DOCUMENTS 5,164,104 A 11/1992 Kobayashi et al.
5,425,818 A 6/1995 Hirosawa et al.
(Continued)

FOREIGN PATENT DOCUMENTS

JP 56100112 8/1981
JP 60221325 11/1985
(Continued)

OTHER PUBLICATIONS

Ishiguro, JP 2000-063999, machine translation (Year: 2000).*
(Continued)

*Primary Examiner* — John A Hevey
(74) *Attorney, Agent, or Firm* — Renner, Otto, Boisselle & Sklar, LLP

(57) ABSTRACT

A process for producing an ordered martensitic iron nitride powder that is suitable for use as a permanent magnetic material is provided. The process includes fabricating an iron alloy powder having a desired composition and uniformity; nitriding the iron alloy powder by contacting the material with a nitrogen source in a fluidized bed reactor to produce a nitride iron powder; transforming the nitride iron powder to a disordered martensitic phase; annealing the disordered martensitic phase to an ordered martensitic phase; and separating the ordered martensitic phase from the iron nitride powder to yield an ordered martensitic iron nitride powder.

15 Claims, 19 Drawing Sheets

Related U.S. Application Data is a continuation of application No. PCT/US2012/070086, filed on Dec. 17, 2012.

(60) Provisional application No. 61/570,955, filed on Dec. 15, 2011.

(51) Int. Cl.

| | |
|---|---|
| H01F 1/06 | (2006.01) |
| H01F 1/08 | (2006.01) |
| C01B 21/06 | (2006.01) |
| C22C 33/02 | (2006.01) |
| C23C 8/62 | (2006.01) |
| B22F 1/02 | (2006.01) |
| C04B 35/626 | (2006.01) |
| C04B 35/58 | (2006.01) |
| C23C 8/26 | (2006.01) |
| C23C 8/80 | (2006.01) |
| B22F 9/08 | (2006.01) |
| B22F 9/04 | (2006.01) |

(52) U.S. Cl.
CPC .... *C04B 35/58042* (2013.01); *C04B 35/6265* (2013.01); *C04B 35/6268* (2013.01); *C04B 35/62615* (2013.01); *C23C 8/26* (2013.01); *C23C 8/62* (2013.01); *C23C 8/80* (2013.01); *H01F 1/065* (2013.01); *H01F 1/08* (2013.01); *H01F 1/083* (2013.01); *H01F 41/0266* (2013.01); *B22F 9/082* (2013.01); *B22F 2009/041* (2013.01); *B22F 2009/043* (2013.01); *C01P 2002/54* (2013.01); *C01P 2006/42* (2013.01); *C04B 2235/404* (2013.01); *C04B 2235/405* (2013.01); *C04B 2235/46* (2013.01); *C04B 2235/465* (2013.01); *C04B 2235/5436* (2013.01); *C04B 2235/81* (2013.01); *C22C 33/0264* (2013.01); *C22C 2202/02* (2013.01)

(58) Field of Classification Search
CPC . C23C 8/62; C04B 35/62615; C04B 35/6268; C04B 35/58042; C04B 35/6265; C04B 2235/81; C04B 2235/404; C04B 2235/5436; C04B 2235/465; C04B 2235/405; C04B 2235/46; B22F 1/02; B22F 9/082; C01B 21/0622; C01P 2002/54; C01P 2006/42; C22C 33/0264
See application file for complete search history.

(56) References Cited

U.S. PATENT DOCUMENTS

| | | | |
|---|---|---|---|
| 5,647,886 A | 7/1997 | Kitazawa et al. | |
| 6,319,485 B1 | 11/2001 | Nagatomi et al. | |
| 9,997,285 B2 * | 6/2018 | Matthiesen | C01B 21/0622 |
| 2005/0208320 A1 * | 9/2005 | Masada | G11B 5/70626 |
| | | | 428/570 |
| 2006/0193742 A1 * | 8/2006 | Miura | B22F 1/0044 |
| | | | 419/52 |
| 2007/0071630 A1 | 3/2007 | Fukuhara et al. | |
| 2009/0184281 A1 | 7/2009 | Yadav et al. | |
| 2010/0068512 A1 | 3/2010 | Imaoka et al. | |
| 2011/0059005 A1 | 3/2011 | Sankar et al. | |
| 2012/0244356 A1 | 9/2012 | Takahashi et al. | |

FOREIGN PATENT DOCUMENTS

| | | |
|---|---|---|
| JP | 04254303 | 9/1992 |
| JP | 7118702 | 5/1995 |
| JP | 8165502 | 6/1996 |
| JP | 08165502 | 6/1996 |
| JP | 2000063999 A * | 2/2000 |
| JP | 2000082610 | 3/2000 |
| JP | 2011051814 | 3/2011 |
| JP | 201191215 | 5/2011 |
| WO | 2011049080 | 4/2011 |

OTHER PUBLICATIONS

Jack, K.H., "The Iron-Nitrogen System: The Preparation and the Crystal Structures of Nitrogen-Austenite (γ) and Nitrogen-Martensite (α)," Proceedings of the Royal Society of London, Series A, Mathematical and Physical Sciences, vol. 208, No. 1093; Aug. 22, 1951, pp. 200-215. (Year: 1951).*

W.E. Wallace et al; Enhanced Fe moment in nitrogen matensite and Fe16N2 (Invited); J. Appl. Phys. 76 (10), Nov. 15, 1994; pp. 6648-6652.

M. Q. Huang et al., "Synthesis and Characterization of Fe16N2 in Bulk Form", J_ Appl. Phys., May 15, 1994, vol. 75, No. 10, pp. 6574-6576.

K. H. Jack, "The Synthesis, Structure, and Characterization of a"Fe16N2 (invited)", J_ Appl. Phys., Nov. 15, 1994, vol. 76, No. 10, pp. 6620-6625.

Iron Nitride Permanent Magnet, Alternative to Rare Earth and Neodymium Magnets. University of Minnesota. Last Modified on Jun. 25, 2010 [retrieved Feb. 27, 2012]. Retrieved from the internet: <URL:www.license.umn.edu/Products/Iron-Nitride-Permanent-Magnet—Alternative-to-Rare-Earth-and-Neodymium-Magnets__20120016.aspx>; first and last bullets on page.

International Search Report and Written Opinion of the International Searching Authority for Corresponding International Application PCT/US2012/070086 dated Mar. 13, 2013.

International Preliminary Report on Patentability Chapter I for Corresponding International Application PCT/US2012/070086 dated Jun. 17, 2014.

Shinichi Kikkawa et al; "Magnetic iron nitrides inspired by historic research on α"-Fe16N2"; Progress in Solid State Chemistry 51 (2018); pp. 19-26; available online Jun. 7, 2017.

K.H. Jack; "The Iron-Nitrogen System: the Preparation and The Crystal Structures of Nitrogen-Austenite (γ) and Nitrogen-Martensite (60 )"; Proceedings of the Royal Society of London. Series A, Mathematical and Physical Sciences, vol. 208, No. 1093; Aug. 22, 1951, pp. 200-215.

Zhiyao Feng; "The Deformation-Induced Martensitic Phase Transformation in Low Chromium Iron Nitrides at Cryogenic Temperatures"; Case Western Reserve University; Department of Materials Science and Engineering; May 2018.

Chinese Office Action dated Dec. 11, 2018 (with English translation) for related Chinese Application No. 201710302326.3.

Korean Office Action dated Jul. 12, 2019 (with English translation) for related Korean Application No. 10-2014-7019503.

Indian Office Action dated May 1, 2018 for related Indian Application No. 1415/MUMNP/2014.

European Office Action dated May 15, 2018 for related European Application No. 12 857 214.6-1106.

* cited by examiner

TRANSFORMATION ENABLED NITRIDE MAGNETS ABSENT RARE EARTHS AND A PROCESS OF MAKING THE SAME

CROSS-REFERENCE

This application is a continuation-in-part of U.S. application Ser. No. 14/304,102 filed Jun. 13, 2014, which is a continuation of International Application No. PCT/US2012/070086 filed Dec. 17, 2012 and designating the U.S., which claims the benefit of U.S. Provisional Application No. 61/570,955 filed on Dec. 15, 2011, all of which are hereby incorporated herein by reference in their entireties.

GOVERNMENT SUPPORT

This invention was made with Government Support under grant number DE-AR0000194, awarded by the U.S. Department of Energy. The Government has certain rights in the invention.

TECHNICAL FIELD

The disclosure relates generally to a composition of iron nitride magnetic powder suitable for use in permanent magnet applications such as wind turbine generators, electric vehicle motors, and the like, and a method of producing the powder.

BACKGROUND

Rare-earth magnets are strong permanent magnets made from alloys of rare earth elements. Rare-earth magnets have significant performance advantages over ferrite or alnico magnets. There are two types of rare-earth magnets: neodymium magnets and samarium-cobalt magnets. The total world market for rare-earth permanent magnets is projected to be $17.2B by 2020, with China expected to control 74% (by tonnage) of this market. The rare-earth magnet segment of this market is expected to continue to grow and is predicted to account for approximately 30% of this total. Accordingly, the market and need for strong permanent magnets is substantial, whereas the supply is limited.

$Fe_{16}N_2$ has been identified as a potential alternative to rare earth metal magnets. FIG. 1 a shows the performance (as indicated by the remanence, Br) as a function of density for $\alpha''-Fe_{16}N_2$ and other classes of permanent magnet materials. A material with high performance and low density is desired because these are critical factors in achieving the system level goals of scalability and cost. The projected cost advantage of $\alpha''-Fe_{16}N_2$ over other permanent magnet materials is shown in FIG. 1 b.

The limitation of the current state of the art is that 100% transformation to single-phase $\alpha''-Fe_{16}N_2$—the phase that exhibits the outstanding magnetic properties—has only been accomplished by sputtering or evaporation in an environment supersaturated with nitrogen. However, when bulk powders or thin films are processed using traditional diffusion techniques, equilibrium thermodynamics limits the available nitrogen to <10.3 at % N. Thus, complete transformation of these powders has never been achieved in the reported literature, even using nano-scale starting powders.

SUMMARY

In accordance with some aspects of the disclosure, a process for producing an ordered martensitic iron nitride powder that is suitable for use as a permanent magnetic material is provided. The process includes fabricating an iron alloy powder having a desired composition and uniformity, nitriding the iron alloy powder by contacting the material with a nitrogen source in a fluidized bed reactor to produce a nitride iron powder, transforming the nitride iron powder to a disordered martensitic phase, annealing the disordered martensitic phase to an ordered martensitic phase and separating the ordered martensitic phase from the iron nitride powder to yield an ordered martensitic iron nitride powder.

In another aspect of the disclosure, a permanent magnet composition comprising an ordered martensitic iron nitride that has been transformed from an austenite phase wherein the magnet composition does not include any substantial amount of rare earth elements is provided.

In yet another aspect of the disclosure, a magnet comprising an ordered martensitic iron nitride powder is provided.

BRIEF DESCRIPTION OF THE DRAWINGS

FIG. 1 b is a graph of remanent induction versus the estimated material cost for hard permanent magnetic materials, in accordance with aspects of the disclosure.

Figure 1A:
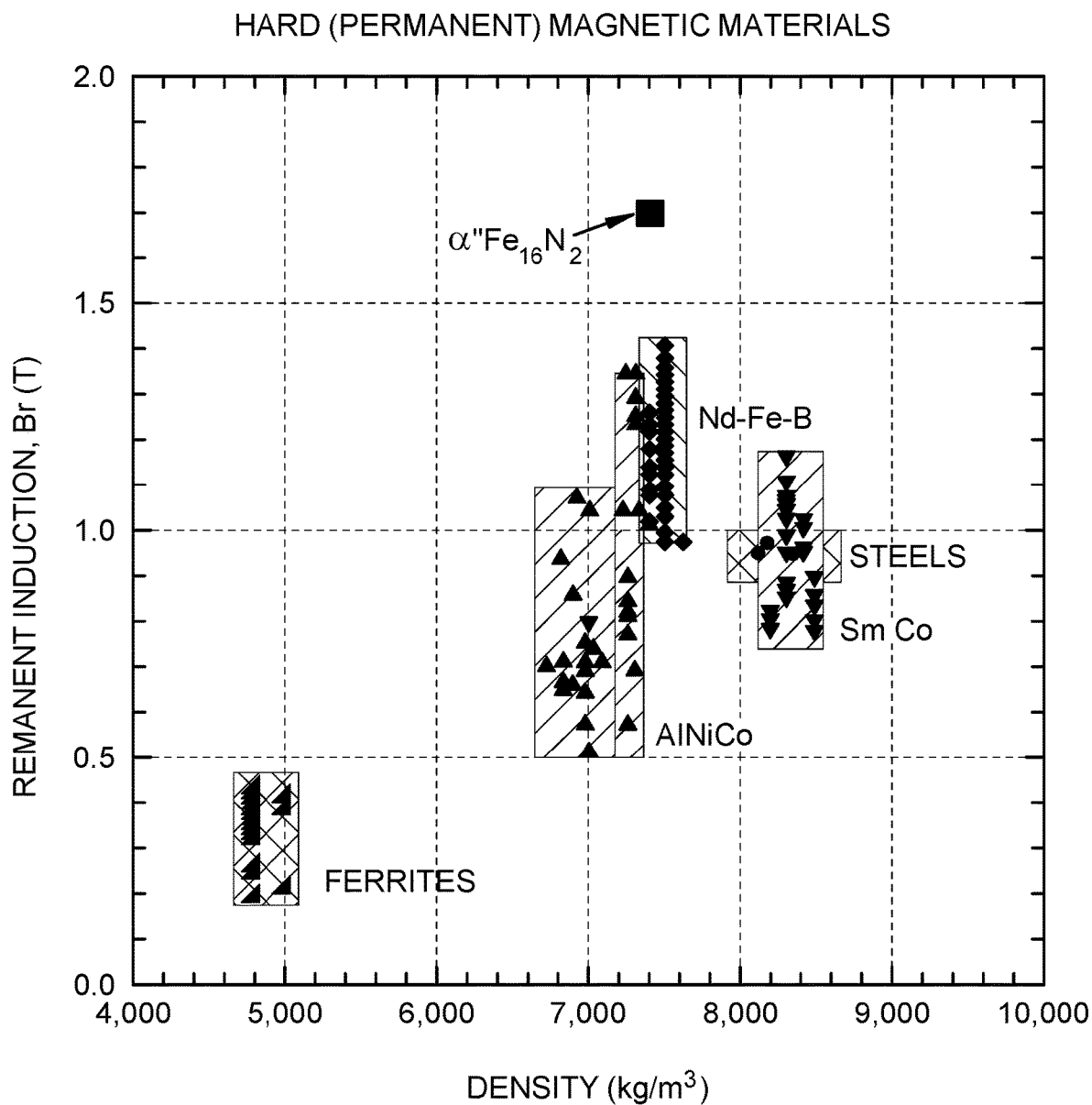
FIG. 1 a is a graph of remanent induction versus density for select hard permanent magnetic materials, including $\alpha''-Fe_{16}N_2$ in accordance with aspects of the disclosure.
Figure 1B:
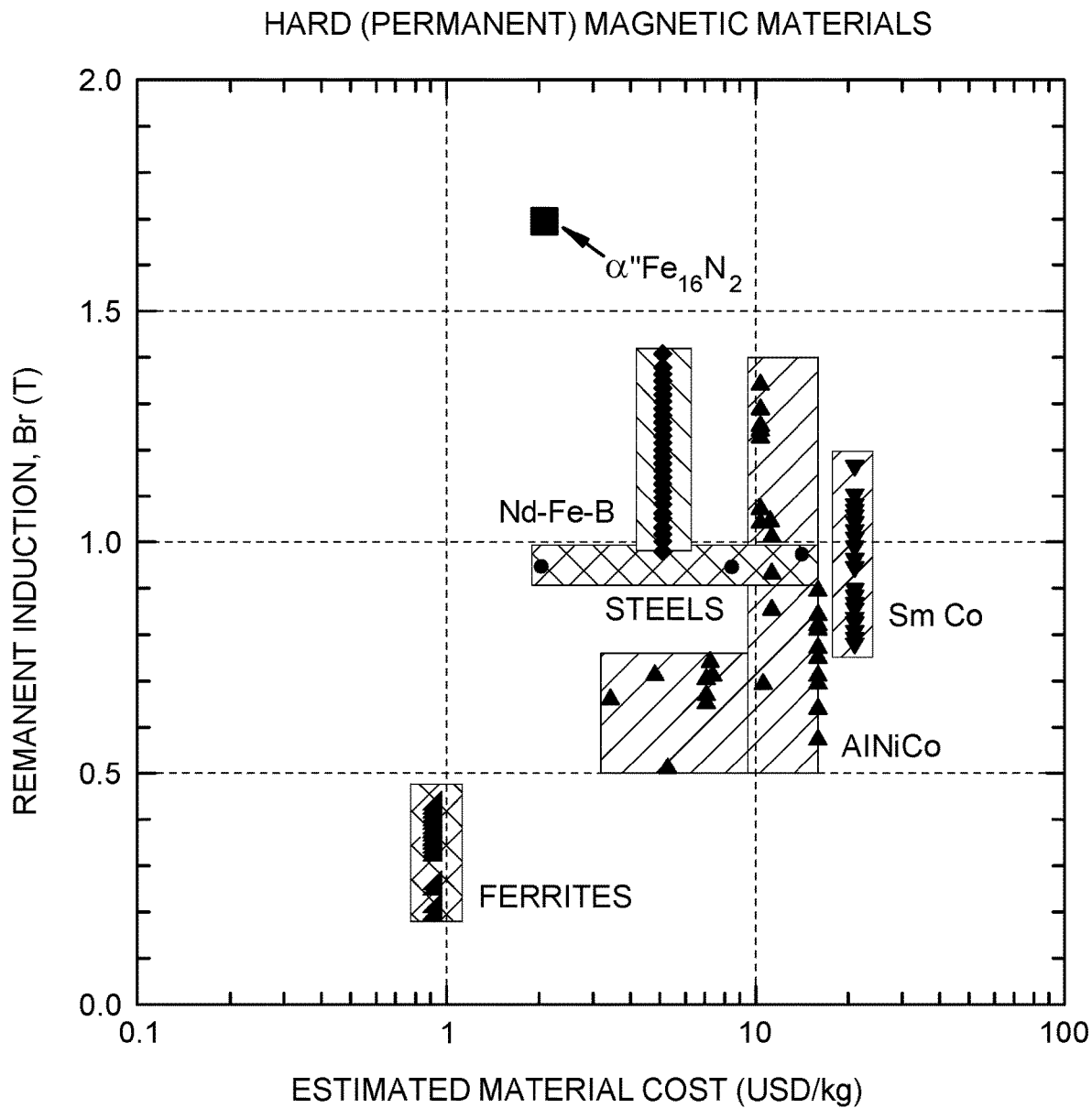

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

DETAILED DESCRIPTION

The invention is directed to a process and composition that eliminates rare earth elements in permanent magnet materials. In particular, bulk powders are transformed to $\alpha''$-$Fe_{16}N_2$, an ordered martensite. This is accomplished by a novel process enabling the dissolving of much more nitrogen in austenitic Fe-base alloys than possible in elemental Fe, transforming the nitrogen-rich austenite to martensite ($\alpha'$) by high energy ball milling, and finally transforming the martensite to the ordered $\alpha''$-$Fe_{16}N_2$ by tempering. The dissolving may have a ratio of 16:2 metal:nitrogen in austenitic Fe-base alloys.

Micro-alloying is used to expand the single-phase austenite ($\gamma$-Fe) region in the Fe—N phase diagram. This enables the nitrogen concentration necessary to produce the intermediate martensite with the optimal stoichiometric composition. A subsequent low temperature aging heat treatment will complete the transformation to $\alpha''$-$Fe_{16}N_2$.

There are at least five (5) steps to the process of making an ordered martensitic iron nitride powder that is suitable as a permanent magnetic material. The steps are: fabricating an iron alloy powder having a desired composition and uniformity; nitriding the iron alloy powder by contacting the material with a nitrogen source in a fluidized bed reactor to produce a nitride iron powder; transforming the nitride iron powder to a disordered martensitic phase; annealing the disordered martensitic phase to an ordered martensitic phase and separating the ordered martensitic phase from the iron nitride powder to yield an ordered martensitic iron nitride powder. Each of these processing steps is explained in detail below.

The preliminary step is to calculate and then fabricate the correct composition of the starting iron alloy powders. Compositions are calculated using a CALPHAD (CALculation of Phase Diagrams) approach. This approach is useful to predict the solubility of carbon and nitrogen in austenitic steels based upon their alloy content. The key insight to this approach is recognizing that alloying elements that enhance the solubility of carbon and nitrogen invariably form relatively stable compound phases with those two elements. Therefore, the aim is to add enough alloying element to increase the solubility, but not so much that a precipitate phase forms that will then greatly reduce the solubility.

The alloying metal is added to increase the concentration of interstitial nitrogen into the $\gamma$-Fe phase (austenite) from equilibrium concentration of 10.3 at % at zero alloying concentration to the desired 11.1 at % nitrogen. The amount of alloying metal needed depends on the alloying material—for instance 1 at % for chromium and 6 at % for manganese. Once the desired composition is calculated the four processing steps may begin.

Fabrication of the iron alloy powder will now be explained. Fabricating the iron alloy powder may be accomplished by using two distinctly different methods. The first method uses melt atomization. During melt atomization, a master alloy of Fe with 20 at % Cr is made in an arc melter. After solidification, additional pure iron powder is added to the master alloy to achieve the desired 99 at % Fe—1 at % Cr alloy. The additional pure iron powder is melted and sprayed out using a melt atomizer process. Melt atomization, however, is an expensive method.

A more cost effective method may be used in which the Fe—Cr powder mixture is initially mechanically alloyed in a mixer mill for a period of time. In some aspects according to the disclosure, the Fe—Cr powder mixture is mechanically allowed in the mixer miller for 48 hours. An example of a suitable mixer mill is the SPEX 8000 mill, which is a high-energy ball mill. The mixture is then homogenized using a high temperature diffusion process at 850° C., which is a temperature below the $\alpha$-Fe to $\gamma$-Fe phase transition temperature. Furthermore, in another embodiment according to the disclosure, an attritor mill is used to achieve the mechanical alloying followed by a high temperature diffusion process. Both of these processes are able to achieve a compositional uniformity of 1.0±0.1 at % Cr in Fe powder.

Other suitable methods to fabricate the iron alloy powder include a powder synthesis technique employing carbonyl-based processing. Another suitable method of obtaining the iron alloy powder is to cast the required compositions followed by mechanically reducing the bulk ingots into powder.

The concentrations of several candidate alloying elements in iron that will enable 11.1 at. % of nitrogen to be soluble in the austenite phase will be defined. The relationship between nitrogen solubility and the alloying element concentration in austenite is determined using CALPHAD-based solution thermodynamic modeling. Calculations are performed using both available ThermoCalc software and an independent database. ThermoCalc software is available from Thermo-Calc Software, Inc., McMurray, Pa.

There are risks involved with this assessment because of the possibility of errors in the parameters contained in the software, or database. Calculations performed using the commercial ThermoCalc software and the independent databases are checked against each other to verify the accuracy of the results.

This methodology is used to determine the solubilities of both carbon and nitrogen in iron-based austenite containing a broad range of alloying elements. The predictions are typically consistent and quite accurate for temperatures above 600° C., the temperature range where it is anticipated that the process of nitriding the iron alloy powder will occur. Once the minimum necessary alloy levels have been established for several candidate elements, e.g. Cr, Mn, Ni, Co, Al, several of those compositions are used for the fabrication of powder.

An iron alloy powder having the compositions prescribed by the thermodynamic modeling is produced. The initial powder composition is chosen based upon the attribute of having a minimum alloy content, i.e., maximum iron content. Making the alloy iron powder involves coating or mechanically alloying essentially pure iron powder particles with the desired alloying element followed by annealing to yield a homogeneous composition.

Once the iron alloy powder is fabricated, a representative sample of particles is evaluated for proper chemistry and homogeneity using energy dispersive x-ray spectroscopy (EDS) in conjunction with a scanning electron microscopes (SEM).

After successfully making the iron alloy powders with the desired composition and uniformity, the Fe alloy powders are nitrided. The iron alloy powders are placed into a fluidized bed reactor. The fluidizing flow rates depend on the particle size of the alloy powder.

For example, the following procedure may be followed using 10-20 µm Fe alloy powder in a 1 inch (2.54 centimeters) diameter reactor starting at room temperature and air atmosphere pressure:
flow nitrogen gas and heat to 580° C. (1076 degree Fahrenheit) allowing 30 minutes for the ramp-to-temperature;
flow a reducing gas mixture (hydrogen/nitrogen mix) for 4 hours at 580° C. (1076 degree Fahrenheit)
switch gas mixture to 20% ammonia/80% nitrogen and anneal for 18 hours at 580° C. (1076 degree Fahrenheit)
slow cool to ~50° C. (122 degree Fahrenheit) under 10% ammonia/90% nitrogen for approximately 20 hours;
vent for enough time with nitrogen to allow safe opening of the system.

In one embodiment according to the disclosure, the iron alloy powder will be exposed to a hydrogen-ammonia ($H_2$:$NH_3$) environment at a temperature above 650° C. (1202 degree Fahrenheit) that will increase the powder's nitrogen content to 11.1 at. %, i.e., the stoichiometric composition for α" phase. The starting powder is a α-phase and the nitridization process causes the powder to transform to γ-phase. A controlled atmosphere furnace is used.

The nitrogen content of the processed nitride iron powder is measured using analytical instrumentation. Analyses with wavelength dispersive x-ray spectroscopy (WDS), Auger electron spectroscopy (AES) and x-ray photoelectron spectroscopy (XPS also referred to as ESCA) is performed. The fully γ-phase, nitride iron powder is then subjected to severe plastic deformation in a high energy ball mill to drive its transformation to α' martensite.

The third step is transforming the nitrided iron alloy powders to the disordered martensitic phase, α'-$Fe_{16}N_2$. After nitriding the iron alloy powder, the α-Fe:1 at % Cr powder has the desired 11.1% nitrogen dissolved interstitially into the alloy. This phase can be transformed into the disordered α'-$Fe_{16}N_2$ phase by combining the effects of low temperature (for example liquid nitrogen temperature of 77 K) with mechanical deformation. This is achieved by placing the nitrided powders into a high energy ball mill that is cooled by liquid nitrogen. Appropriate care must be taken to properly vent the mill mixing vial such that over pressurization does not occur.

The fourth step is annealing the disordered martensitic phase, α"-$Fe_{16}N_2$ to the ordered martensitic phase, α"-$Fe_{16}N_2$. A low temperature anneal is required to achieve the ordered martensitic phase, α"-$Fe_{16}N_2$. Suitable temperatures for the low temperature anneal may range from 100° C. (212 degree Fahrenheit) to 300° C. (572 degree Fahrenheit).

The γ-phase nitrided iron powder containing 11.1 at. % nitrogen will be transformed to α' martensite retaining the same nitrogen content. At the 11.1 at. % nitrogen level the powder will be quite resistant to transformation to α'. To enable the transformation to proceed, the γ-phase powder will be subjected to a significant amount of plastic deformation in a high energy ball mill. The ball milling is intended to occur at room temperature. Alternatively, the ball milling may require liquid nitrogen temperatures as described above. If the temperature of the powder rises substantially due to its absorption of energy during repeated impacts, or an increased driving force is required to ensure the γ to α' transformation goes to completion, active cooling also will be employed during ball milling. The γ to α' transformation is facilitated with relatively large size powder particles. Once transformation to α' martensite is finished further ball milling can be used to reduce the final average powder particle size. The ball milled powder is analyzed using a standard x-ray diffraction technique to determine if any γ-phase is retained.

Next, the austenite powder that has been converted to α' will be transformed to α" the final material produced by the disclosed process. For this purpose, the α' powder is tempered. The ideal temperature for this processing step is around 420K (147° C.). Based on this ideal temperature, the temperature range used is between 370K (97° C.) and 470K (197° C.) and a range of annealing times from 1,000 s up to 86,000s (24 h) if needed.

If surface oxidation of the powder turns out to progress at a disturbingly rapid level, the powders will be encapsulated in evacuated and Ar-backfilled fused silica ampoules. The results are validated by XRD (X-ray diffractometry) and TEM (transmission electron microscopy). XRD is also carried out using an X-ray diffraction system. TEM is carried out using a transmission electron microscope, either the Tecnai F30 (FEI) or the Libra 200EF (Zeiss). Both techniques can discriminate between α' and α" by evaluating the superlattice reflections that arise in diffraction patterns because of the ordering that offsets α" from α'.

The final step involves separating the ordered martensitic phase, α"-$Fe_{16}N_2$ from the mixed nitride powder. It is possible that after completion of all the processing steps, a mixed powder exists of the desired ordered martensitic phase, α"-$Fe_{16}N_2$ plus other undesired iron and iron nitride phases. A separation process using the fluidized bed and an external magnetic field is used to filter the desired phase.

Figure 2:
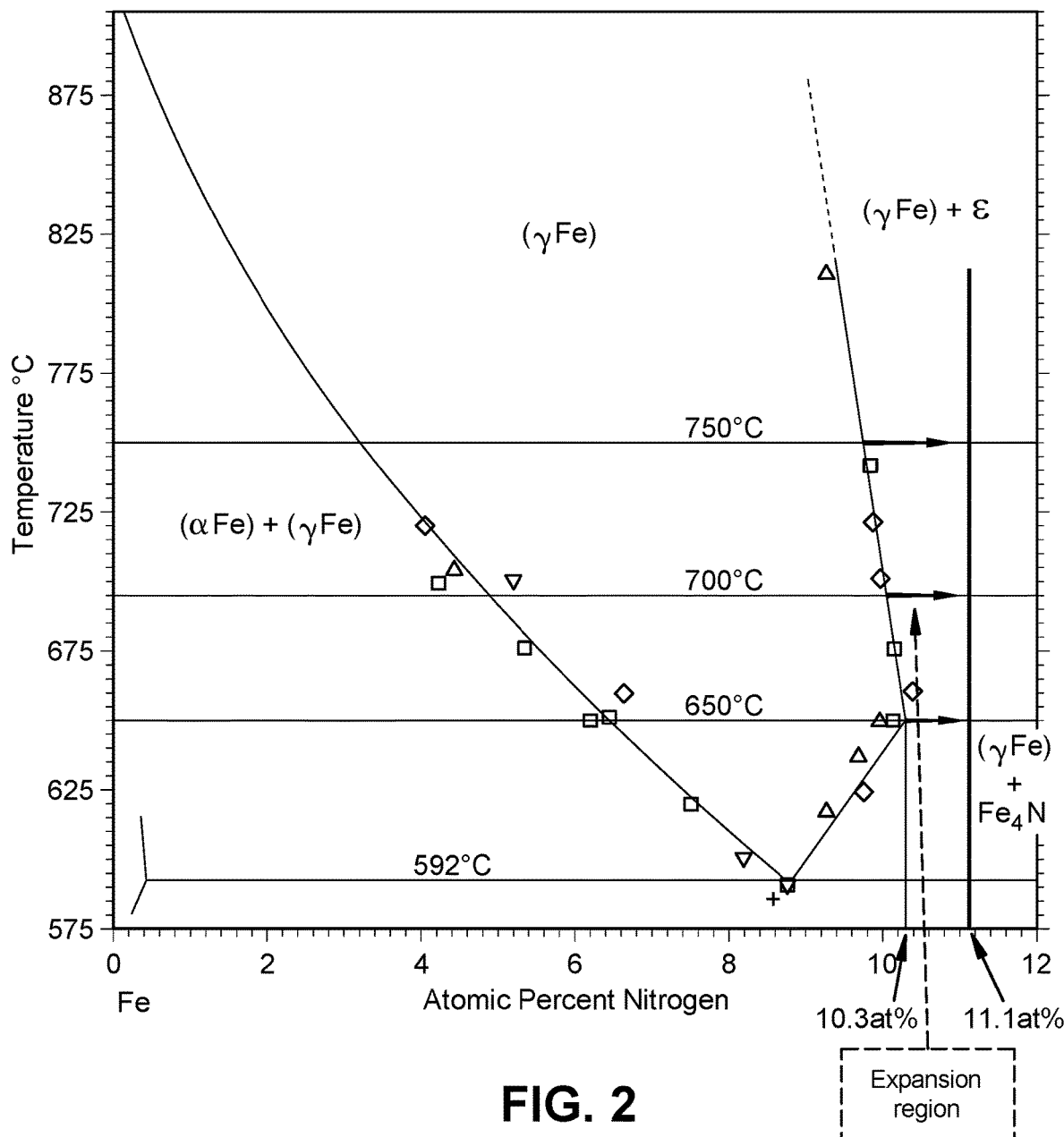
FIG. 2 is a partial Fe—N phase diagram showing temperature in Celsius versus atomic percent nitrogen in iron.

The new powder composition can be used to form a permanent magnet, which can be used in electric motor, generator products, and the like. The new composition can be used to make magnets to replace existing Nd—Fe—B-permanent magnets and other rare-earth permanent magnets. Calculations of Desired Alloy Content Using the CALPHAD Method:

As discussed above, a unique aspect of the present disclosure includes alloying the starting iron powder with a desired alloy composition to expand the single-phase austenitic (γ-Fe) region in the Fe—N phase diagram, such that more nitrogen may be dissolved in the γ-austenitic Fe-base alloy than is possible with elemental Fe under the same conditions. The concept of alloying to expand the γ-Fe region beyond the maximum solubility of 10.3 at. % nitrogen in elemental iron is illustrated in the Fe—N phase diagram (partial) in FIG. 2.

As shown in the illustrated Fe—N phase diagram, the solubility of nitrogen in the austenite phase (γ-Fe) is limited by the formation of the γ'-Fe$_4$N and ε-phases. Those phases (Fe$_4$N and ε-Fe) define the maximum thermodynamic activity of nitrogen in γ-austenite. Therefore, according to an aspect of the present disclosure, the starting iron powder is alloyed enough to increase the solubility of nitrogen in the single phase γ-austenite region beyond 10.3 at. % N (the limit for pure Fe), but is not alloyed so much that a precipitate phase forms that will then greatly reduce the solubility. As discussed above, in order to calculate the desired composition of the iron alloy powder, the CALPHAD method is used to show the solubility of nitrogen in austenitic steels based on their alloy content. More particularly, as discussed above, the CALPHAD method is used to establish the desired alloy composition for expanding the solubility of nitrogen in γ-austenite to 11.1 at. % N, which is the stoichiometric composition for providing single-phase ordered martensite α"-Fe$_{16}$N$_2$. In other words, alloying iron to expand the γ-austenite region to 11.1 at. % N allows the formation of a single-phase austenitic iron alloy nitride material that has the proper stoichiometry to form the ordered martensite (α"-Fe$_{16}$N$_2$) having desirable magnetic properties.

The utilization of the CALPHAD method for showing the desired iron alloy composition that enables nitrogen content to be enhanced up to 11.1 at. % N in γ-austenite is discussed above. As discussed, the CALPHAD methodology can be used to show the solubilities of nitrogen in iron-based austenite containing a broad range of alloying elements. The calculations are typically consistent and quite accurate for temperatures above 600° C., which is the temperature range where nitriding the iron alloy powder occurs. Candidate elements, e.g., Cr, Mn, Ni, Co, Al are described above as suitable for use in the fabrication of the iron alloy powder, and the range of these components are provided by the CALPHAD calculation. For example, exemplary compositions provided by the CALPHAD calculation are discussed above, in which alloy additions of 1 at. % for chromium and 6 at. % for manganese are respectively specified.

Based on the CALPHAD method described above, it is understood that the desired composition of the iron alloy powder, and consequently the γ-austenite iron alloy nitride powder, has different compositional ranges of the alloying elements in order to achieve the desired 11.1 at. % N during the nitriding process. In the following discussion, such CALPHAD calculations are described in further detail to illustrate the desired composition of the iron alloy nitride powder for the alloying elements of Cr, Al, and Mn in order to achieve 11.1 at. % N during the nitriding process.

Calculation of the Range of Cr Content Using the CALPHAD Method

The CALPHAD method is used to calculate the range of Cr content in the Cr—Fe—N ternary system that achieves single-phase γ-austenite (i.e., 100% γ-Fe—Cr—N) having the desired 11.1 at. % N content. The calculations are run at a temperature range of greater than 600° C. as described above.

Figure 3:
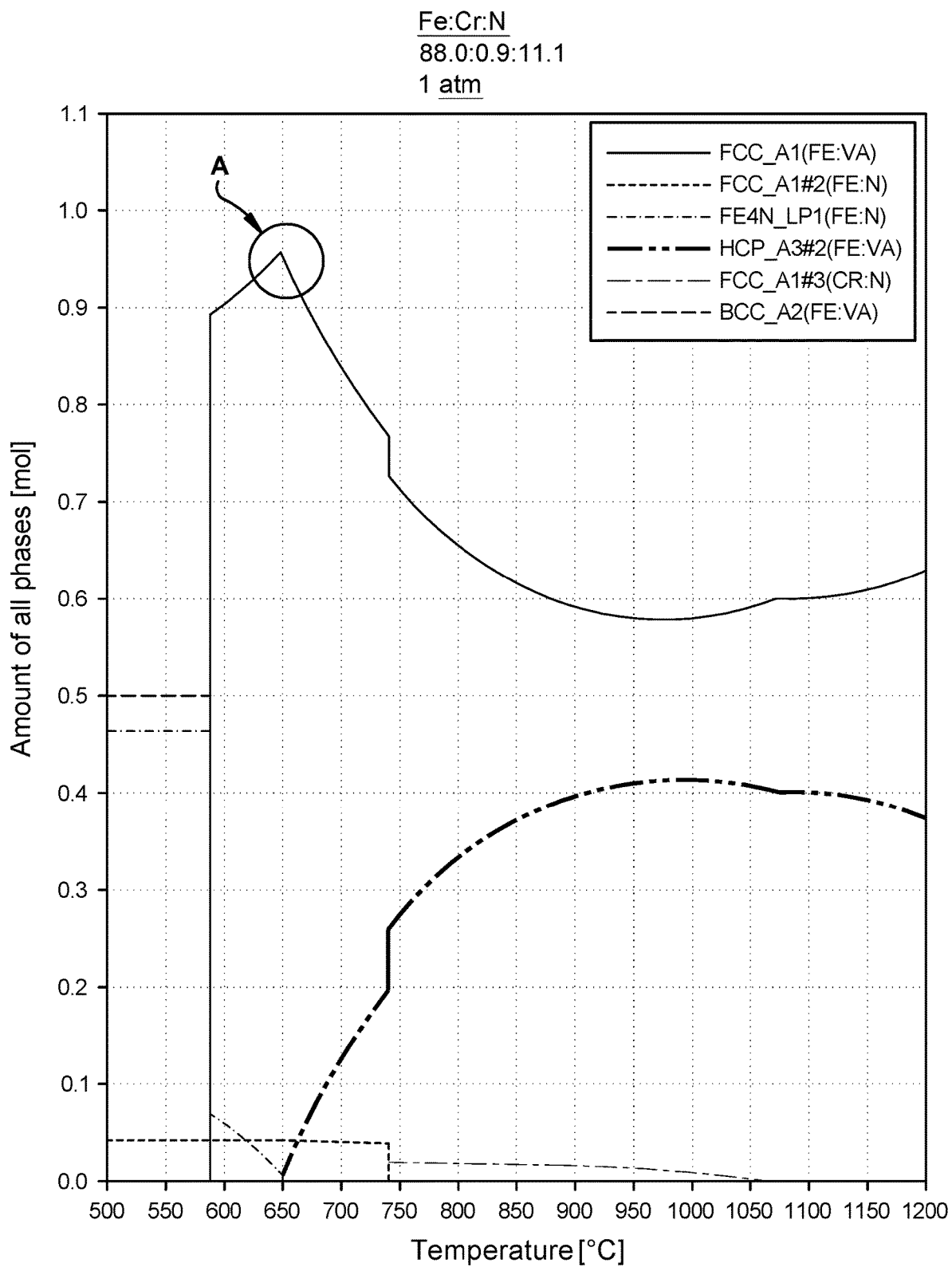
FIG. 3 shows the results of a CALPHAD calculation for an alloy composition of 88.0 at. % Fe—0.9 at. % Cr—11.1 at. % N.

FIG. 3 shows the results of the CALPHAD calculation at 0.9 at. % Cr (e.g., 88.0 at. % Fe—0.9 at. % Cr—11.1 at. % N). The desired γ-phase austenite is a face centered cubic (FCC) structure and is represented by the line FCC_A1(FE:VA). In showing whether single-phase (e.g., 100%) γ-austenite is formed, the FCC_A1(FE:VA) line is compared to the other phases illustrated in the diagram. In this case, at the highlighted region "A" of interest, the γ-austenite is present at 650° C., but at this temperature the "FCC_A1#2(FE:N)" phase also appears present, which is representative of a CrN phase. It is known that Fe and Cr can form solid solutions with each other, and by referencing a separate calculation it is determined that FCC_A1#2(FE:N) is a non-stoichiometric FCC CrN having a composition of (Fe$_{0.6}$Cr$_{0.4}$)$_{0.6}$N$_{0.4}$, and the FCC_A1#3(CR:N) is stoichiometric FCC CrN having a composition of (Fe$_{0.12}$Cr$_{0.86}$)N. However, the literature in the Bulletin of Alloy Phase Diagrams indicates that CrN is actually very difficult to form—its formation is "kinetically suppressed." Thus, in FIG. 3, although the non-stoichiometric CrN (FCC_A1#2(FE:N)) is shown to form from the thermodynamic calculations, its kinetic suppression during processing indicates that it will not form. Accordingly, at 0.9 at. % Cr, a single-phase (100%) γ-austenite having the desired 11.1 at. % N will form at 650° C.

The calculations discussed above with reference to FIG. 3 also apply to the remaining calculations illustrated in FIGS. 4-10.

Figure 4:
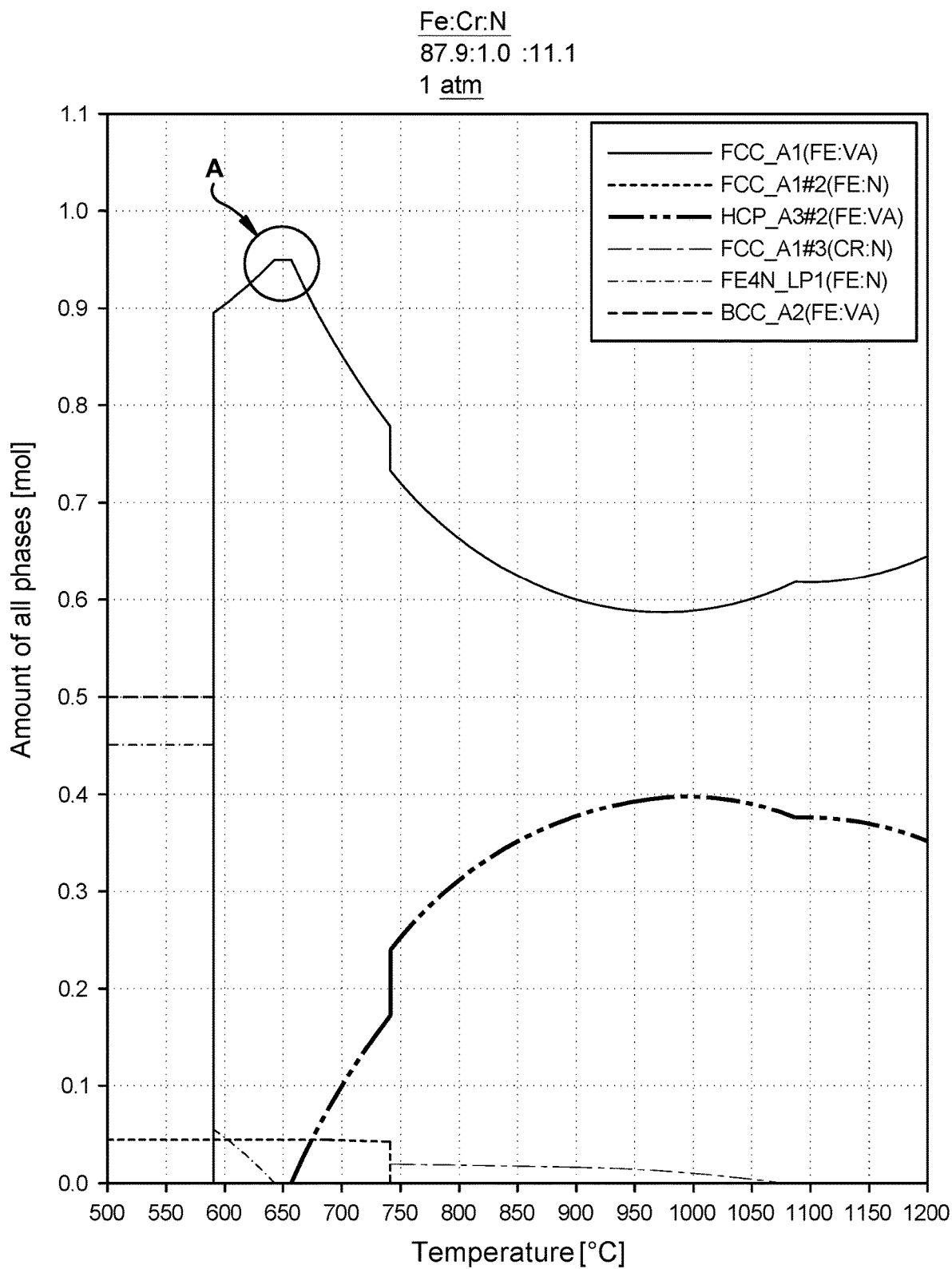
FIG. 4 shows the results of a CALPHAD calculation for an alloy composition of 87.9 at. % Fe—1.0 at. % Cr—11.1 at. % N.

FIG. 4 shows the results of the CALPHAD calculation at 1.0 at. % Cr (e.g., 87.9 at. % Fe—1.0 at. % Cr—11.1 at. % N). As shown in the highlighted region "A", at 1.0 at. % Cr a single-phase (100%) γ-austenite having the desired 11.1 at. % N (line FCC_A1(FE:VA)) will form in a temperature range of around 625° C. to 675° C.

Figure 5:
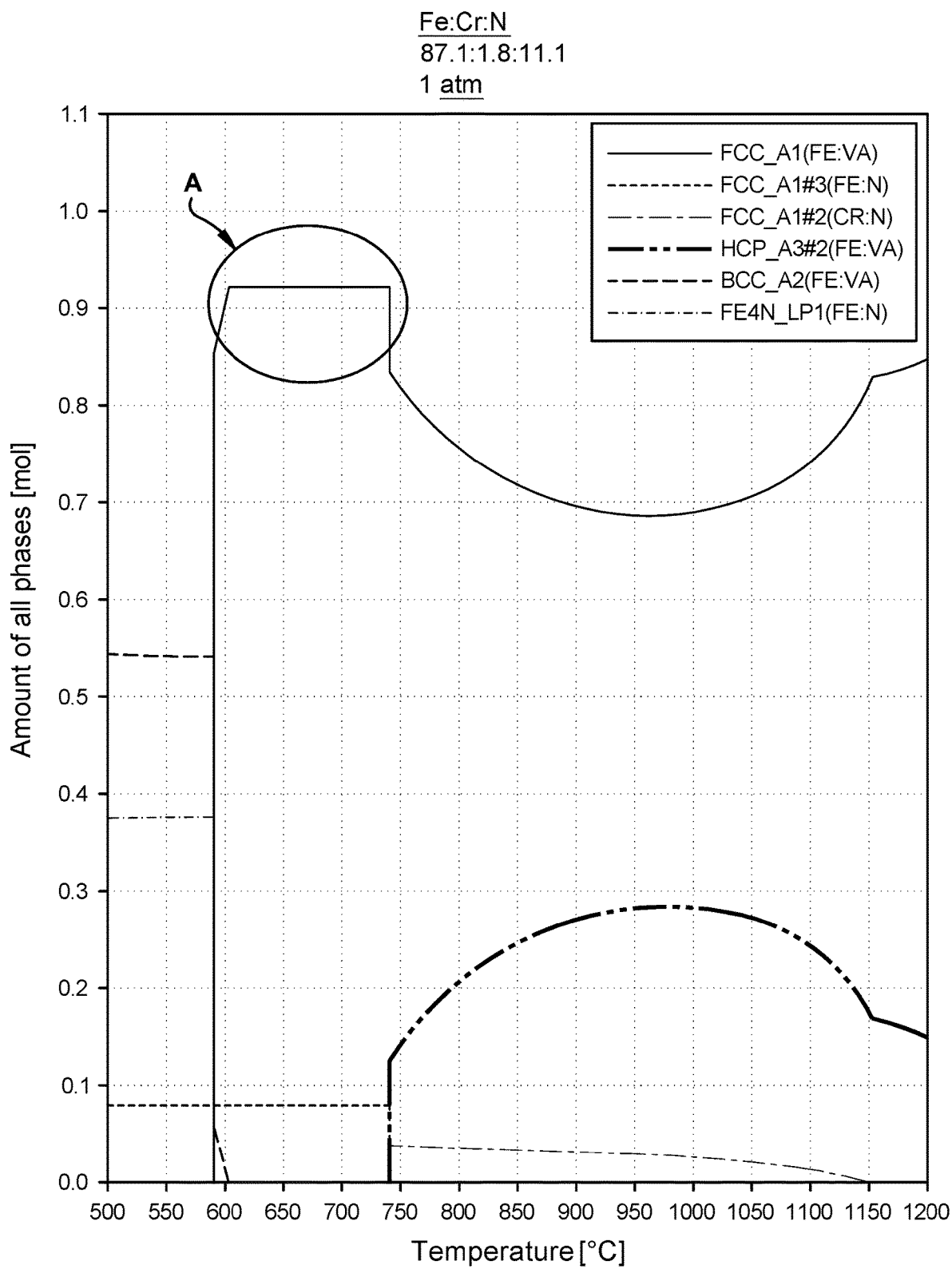
FIG. 5 shows the results of a CALPHAD calculation for an alloy composition of 87.1 at. % Fe—1.8 at. % Cr—11.1 at. % N.

FIG. 5 shows the results of the CALPHAD calculation at 1.8 at. % Cr (e.g., 87.1 at. % Fe—1.8 at. % Cr—11.1 at. % N). As shown in the highlighted region "A", at 1.8 at. % Cr a single-phase (100%) γ-austenite having the desired 11.1 at. % N FCC_A1(FE:VA)) will form in a temperature range of around 600° C. to 740° C.

Figure 6:
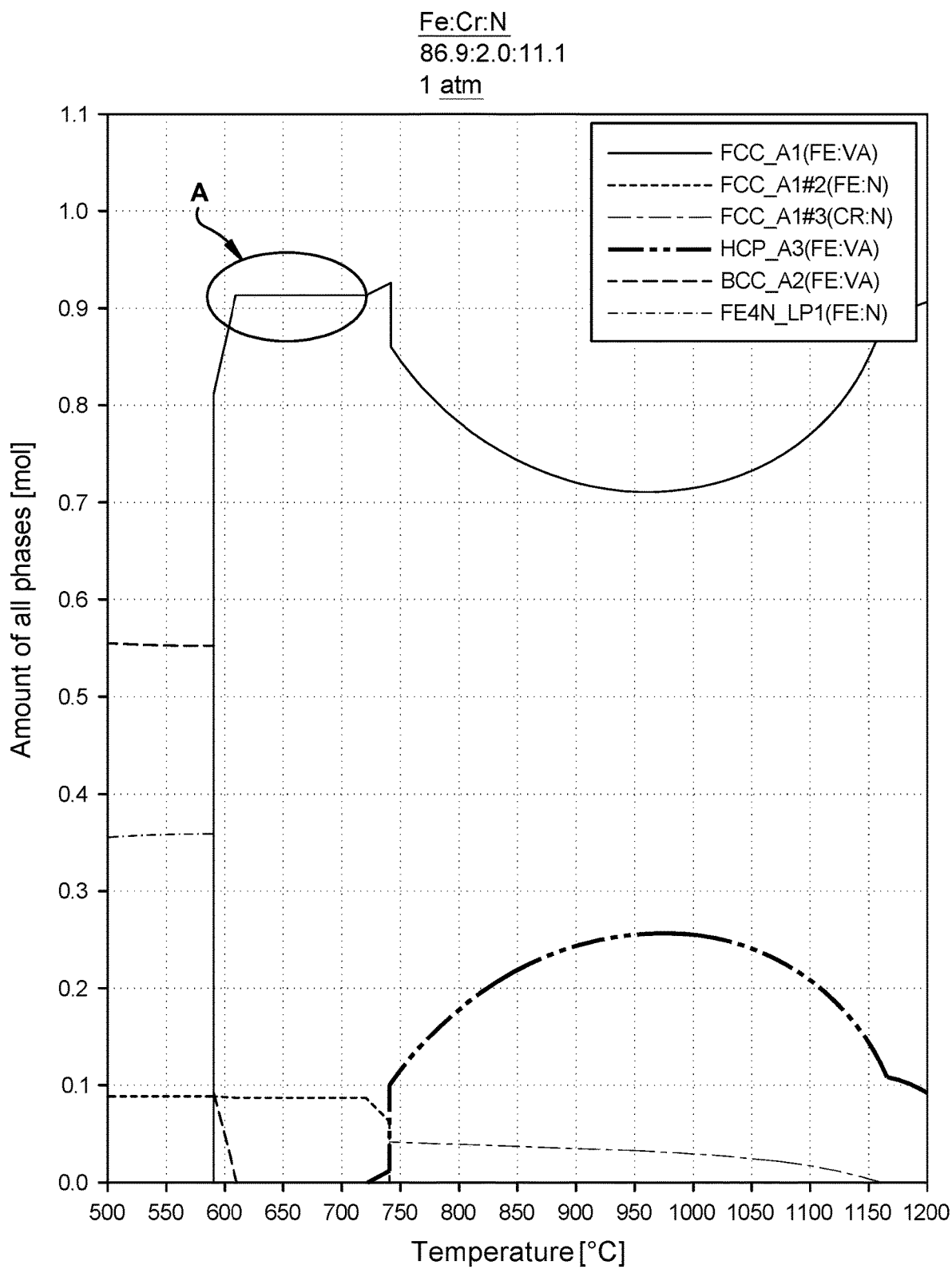
FIG. 6 shows the results of a CALPHAD calculation for an alloy composition of 86.9 at. % Fe—2.0 at. % Cr—11.1 at. % N.

FIG. 6 shows the results of the CALPHAD calculation at 2.0 at. % Cr (e.g., 86.9 at. % Fe—2.0 at. % Cr—11.1 at. % N). As shown in the highlighted region "A", at 2.0 at. % Cr a single-phase (100%) γ-austenite having the desired 11.1 at. % N FCC_A1(FE:VA)) will form in a temperature range of around 610° C. to 725° C. At greater than about 725° C., the formation of the hexagonal closed packed (HCP) epsilon phase (HCP_A3(FE:VA) line) also is expected to form, which has shortened the temperature window compared to FIG. 5 for achieving single-phase austenite.

Figure 7:
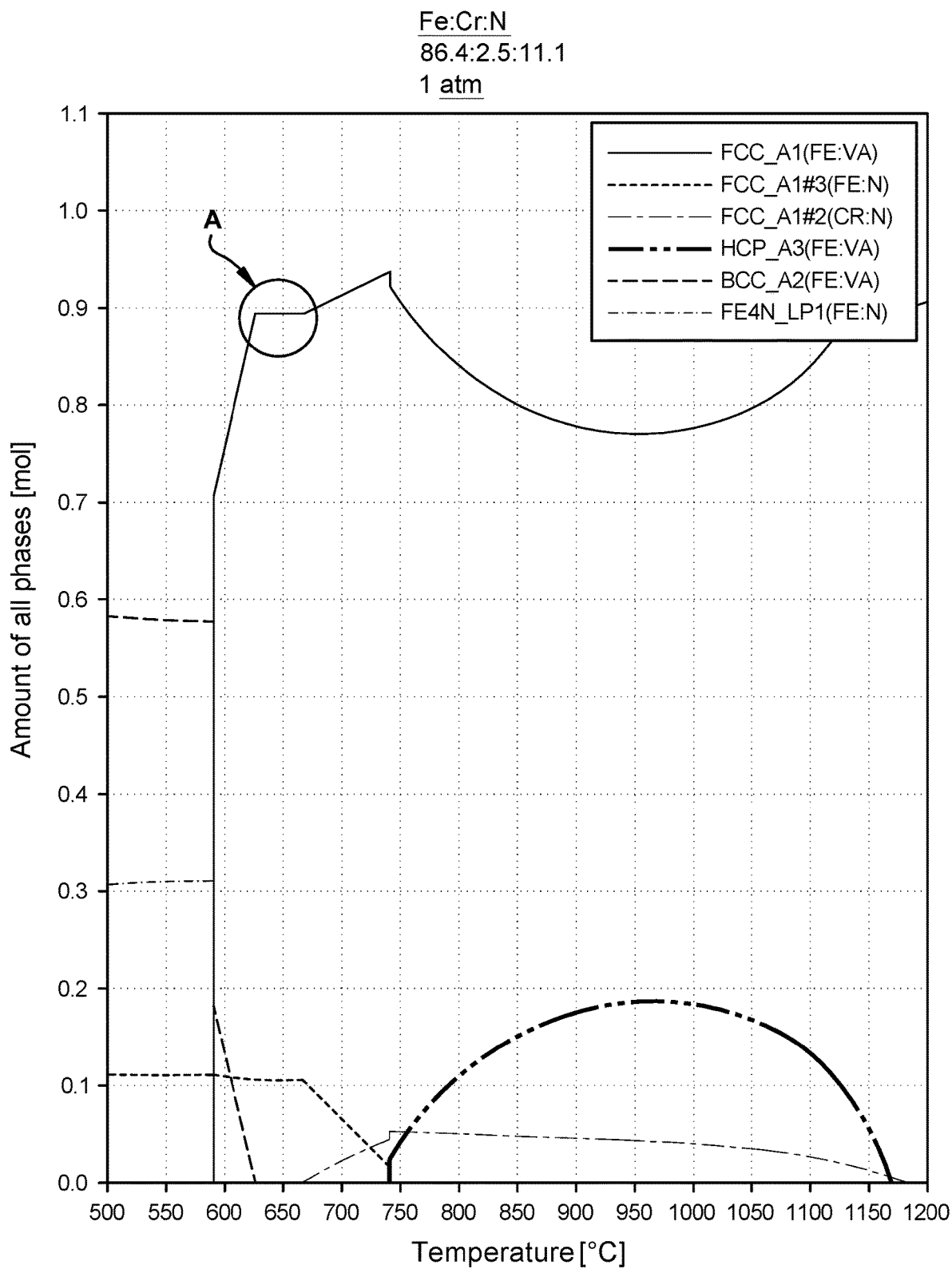
FIG. 7 shows the results of a CALPHAD calculation for an alloy composition of 86.4 at. % Fe—2.5 at. % Cr—11.1 at. % N.

FIG. 7 shows the results of the CALPHAD calculation at 2.5 at. % Cr (e.g., 86.4 at. % Fe—2.5 at. % Cr—11.1 at. % N). As shown in the highlighted region "A", at 2.5 at. % Cr a single-phase (100%) γ-austenite having the desired 11.1 at. % N FCC_A1(FE:VA)) will form in a temperature range of around 625° C. to 675° C. As shown, the formation of the stoichiometric FCC CrN phase (line FCC_A1#2(CR:N)) also is expected to form at temperatures greater than about 675° C., which shortens the temperature window for achieving single-phase austenite.

Figure 8:
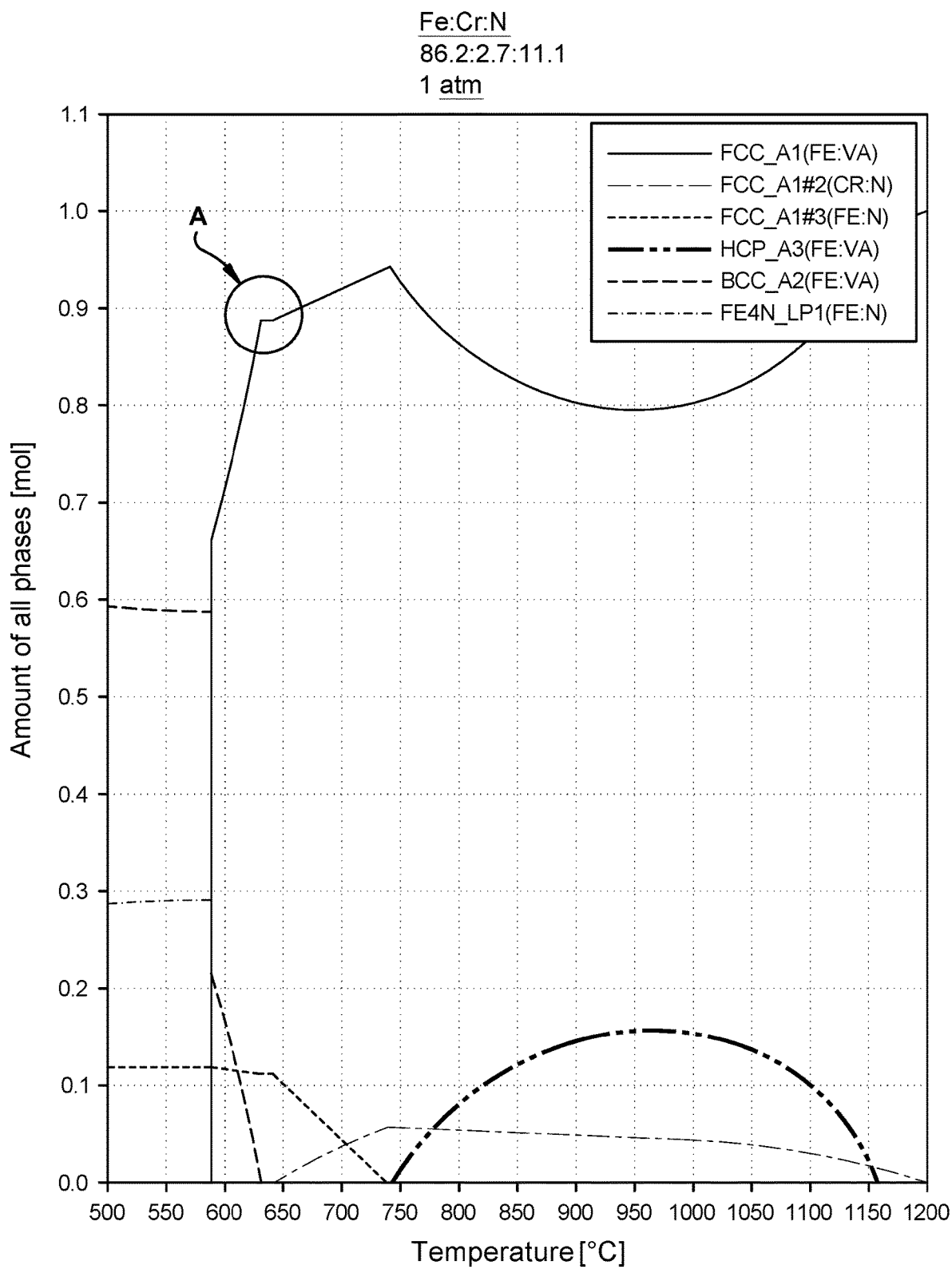
FIG. 8 shows the results of a CALPHAD calculation for an alloy composition of 86.2 at. % Fe—2.7 at. % Cr—11.1 at. % N).

FIG. 8 shows the results of the CALPHAD calculation at 2.7 at. % Cr (e.g., 86.2 at. % Fe—2.7 at. % Cr—11.1 at. % N). As shown in the highlighted region "A", at 2.7 at. % Cr a single-phase (100%) γ-austenite having the desired 11.1 at. % N FCC_A1(FE:VA)) will form in a short temperature range of around 625° C. Above that temperature, the formation of the stoichiometric FCC CrN phase (line FCC_A1#2(CR:N)) is expected to occur. Below that temperature, the formation of a body centered cubic (BCC) alpha (ferrite) phase (line BCC_A2(FE:VA)) is expected to occur.

FIGS. 2-8 demonstrate that the compositional range of Cr content that achieves single-phase γ-austenite is: 0.9 at. % Cr 2.7 at. %, as is provided using the CALPHAD calculation according to the present disclosure.

In order to demonstrate the criticality of the foregoing range of Cr content, the CALPHAD calculations were run at Cr levels below and above the above-mentioned range.

Figure 9:
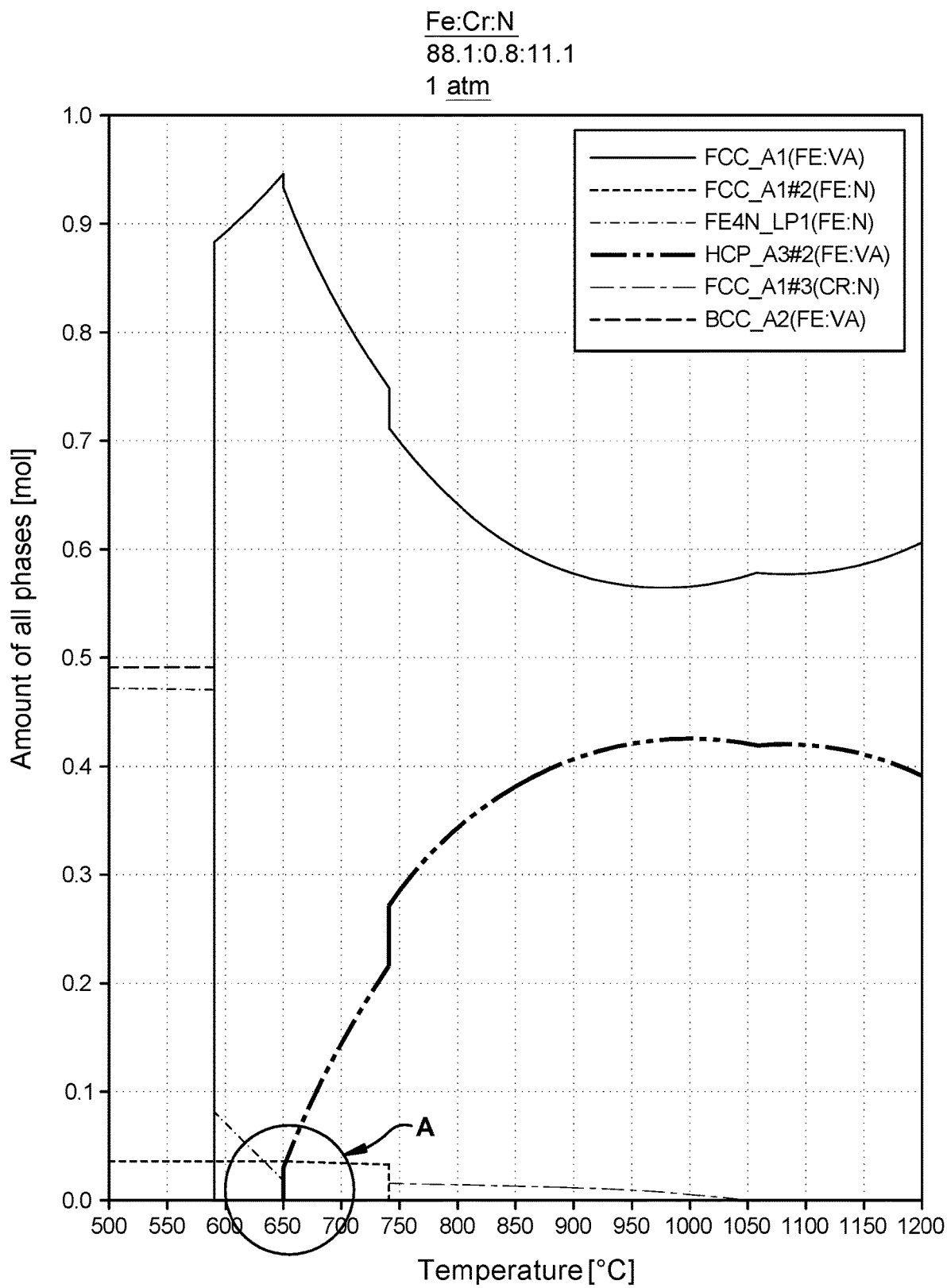
FIG. 9 shows the results of a CALPHAD calculation for an alloy composition of 88.1 at. % Fe—0.8 at. % Cr—11.1 at. % N).

FIG. 9 shows the results of the CALPHAD calculation at 0.8 at. % Cr (e.g., 88.1 at. % Fe—0.8 at. % Cr—11.1 at. % N). As shown in the highlighted region "A", at 0.8 at. % Cr the thermodynamically stable $Fe_4N$ phase (line FE4N_LP (FE:N)) will form at temperatures at or below 650° C., and the HCP epsilon phase (line HCP_A3#2(FE:VA)) will form at temperatures above 650° C. Therefore, a single-phase γ-austenite FCC_A1(FE:VA)) will not form at the 0.8 at. % Cr content.

Figure 10:
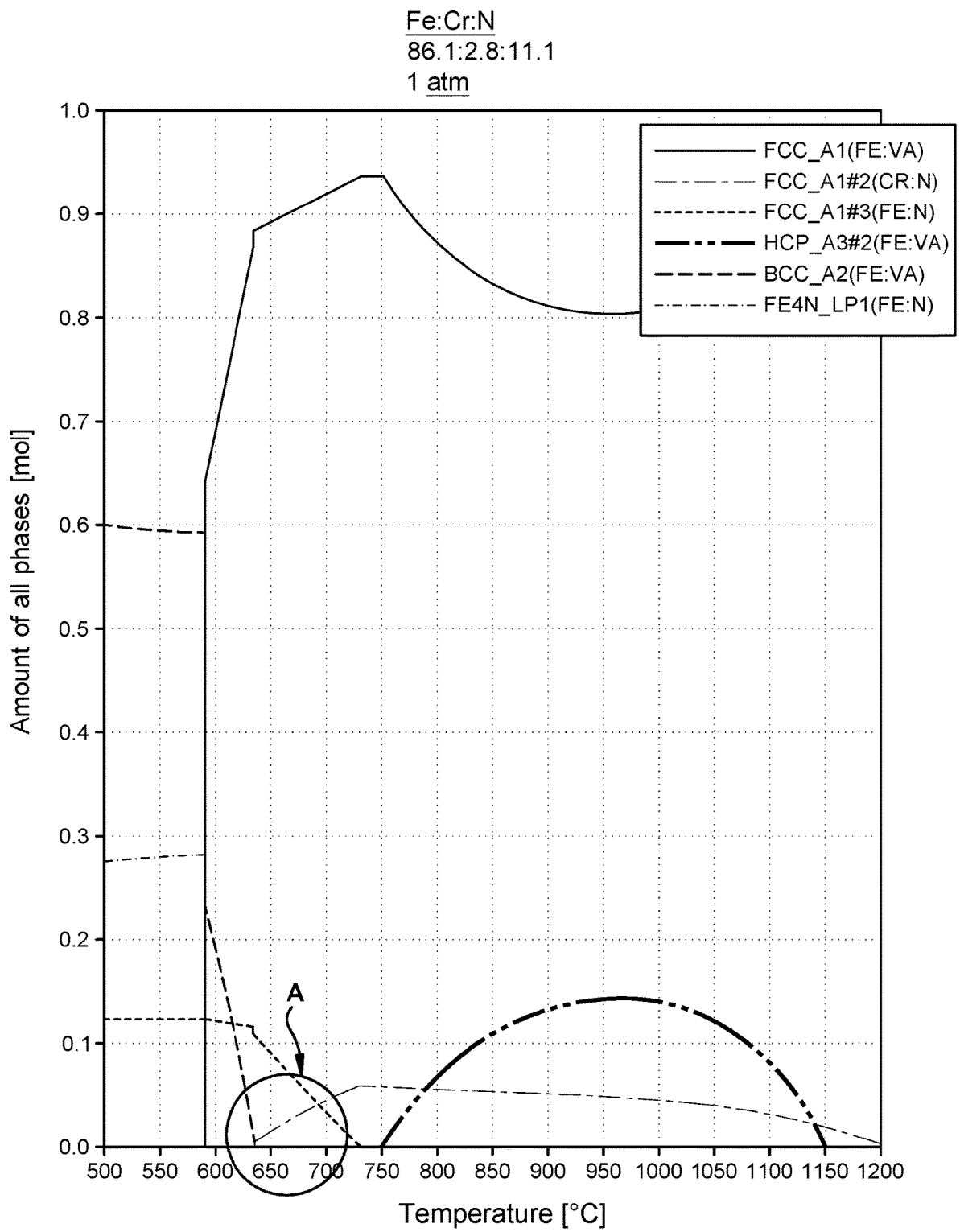
FIG. 10 shows the results of a CALPHAD calculation for an alloy composition of 86.1 at. % Fe—2.8 at. % Cr—11.1 at. % N.

FIG. 10 shows the results of the CALPHAD calculation at 2.8 at. % Cr (e.g., 86.1 at. % Fe—2.8 at. % Cr—11.1 at. % N). As shown in the highlighted region "A", at 2.8 at. % Cr the thermodynamically stable alpha (ferrite) phase (line BCC_A2(FE:VA)) will form at temperatures below about 640° C., and the stoichiometric FCC CrN phase (line FCC_A1#2(CR:N)) will form at temperatures above about 640° C. Therefore, a single-phase γ-austenite FCC_A1(FE:VA)) will not form at the 2.8 at. % Cr content.

In summary, the CALPHAD calculations shown in FIGS. 2-10 demonstrate that a range of 0.9 at. %≤Cr≤2.7 at. % exists for obtaining single-phase γ-austenite.

Calculation of the Range of Al Content Using the CALPHAD Method

The CALPHAD method is used to calculate the range of Al content in the Al—Fe—N ternary system that achieves single-phase γ-austenite (i.e., 100% γ-Fe—Al—N) having the desired 11.1 at. % nitrogen content. The calculations are run at a temperature range of greater than 600° C.

Figure 11:
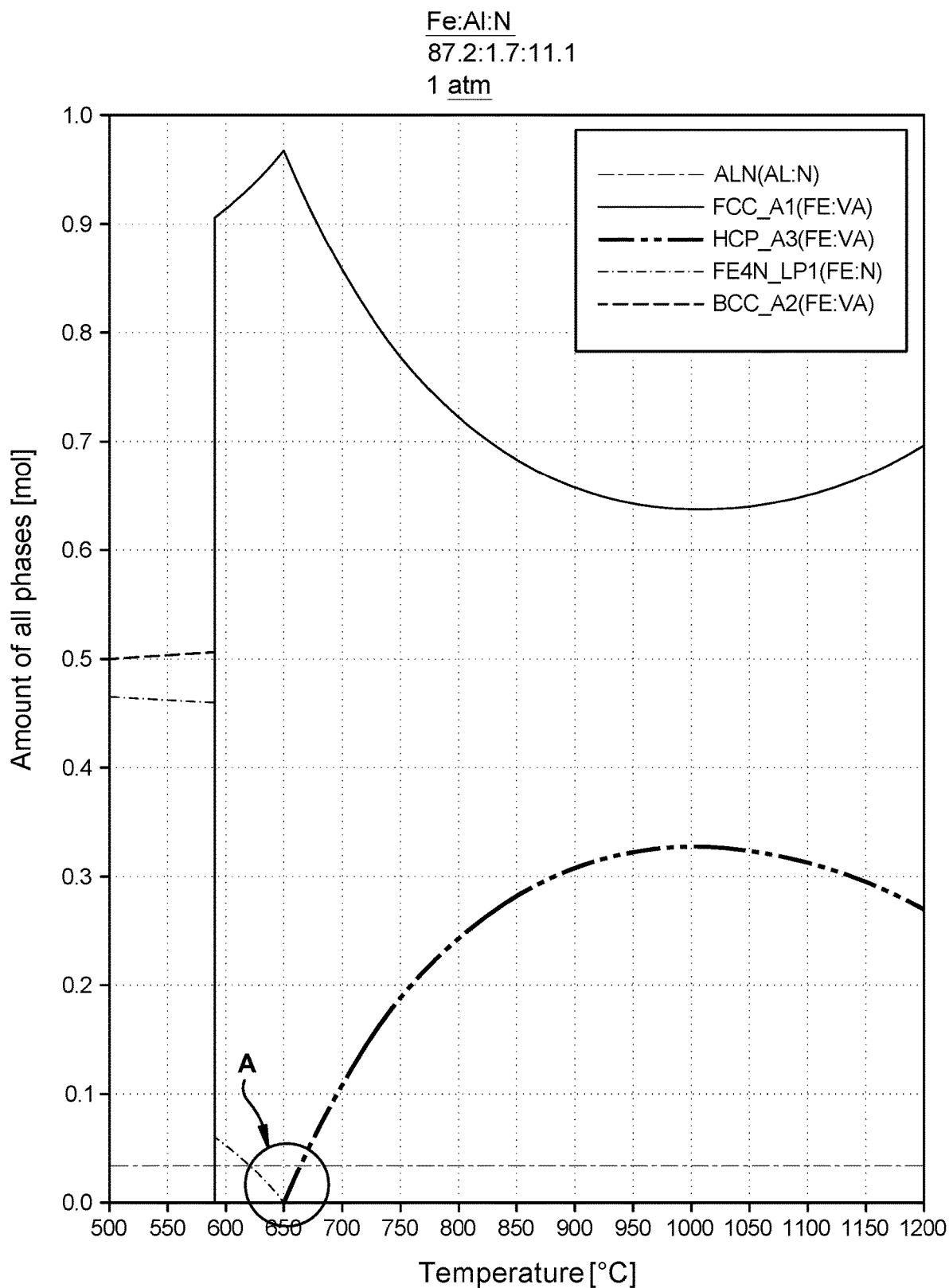
FIG. 11 shows the results of a CALPHAD calculation for an alloy composition of 87.2 at. % Fe—1.7 at. % Al—11.1 at. % N.

FIG. 11 shows the results of the CALPHAD calculation at 1.7 at. % Al (e.g., 87.2 at. % Fe—1.7 at. % Al—11.1 at. % N). The desired γ-phase austenite is a face centered cubic (FCC) structure and is represented by the line FCC_A1(FE:VA). In showing whether single-phase (e.g., 100%) γ-austenite is formed, the FCC_A1(FE:VA) line is compared to the other phases illustrated in the diagram. In this case, at the highlighted region "A" of interest, the γ-austenite is present at 650° C., but at this temperature the "ALN(AL:N)" phase also appears present, which is representative of an AlN phase. As similarly discussed above with respect to Cr, it is known that Fe and Al can form solid solutions with each other, but the AlN phase is kinetically suppressed during processing such that the AlN phase will not form. Accordingly, at 1.7 at. % Al, a single-phase (100%) γ-austenite having the desired 11.1 at. % N (line FCC_A1(FE:VA)) will form at 650° C.

Figure 12:
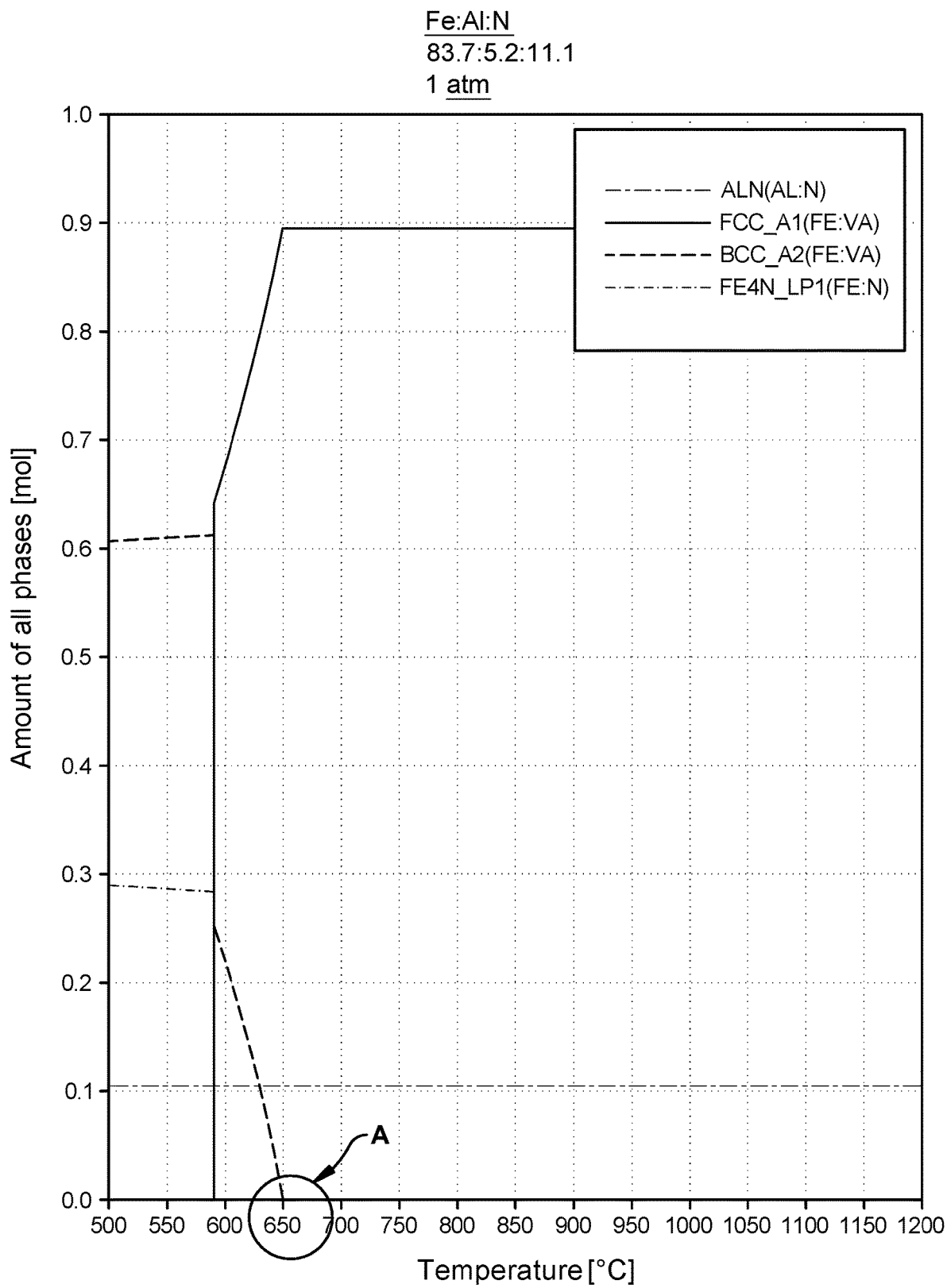
FIG. 12 shows the results of a CALPHAD calculation for an alloy composition of 83.7 at. % Fe—5.2 at. % Al—11.1 at. % N.
Figure 13:
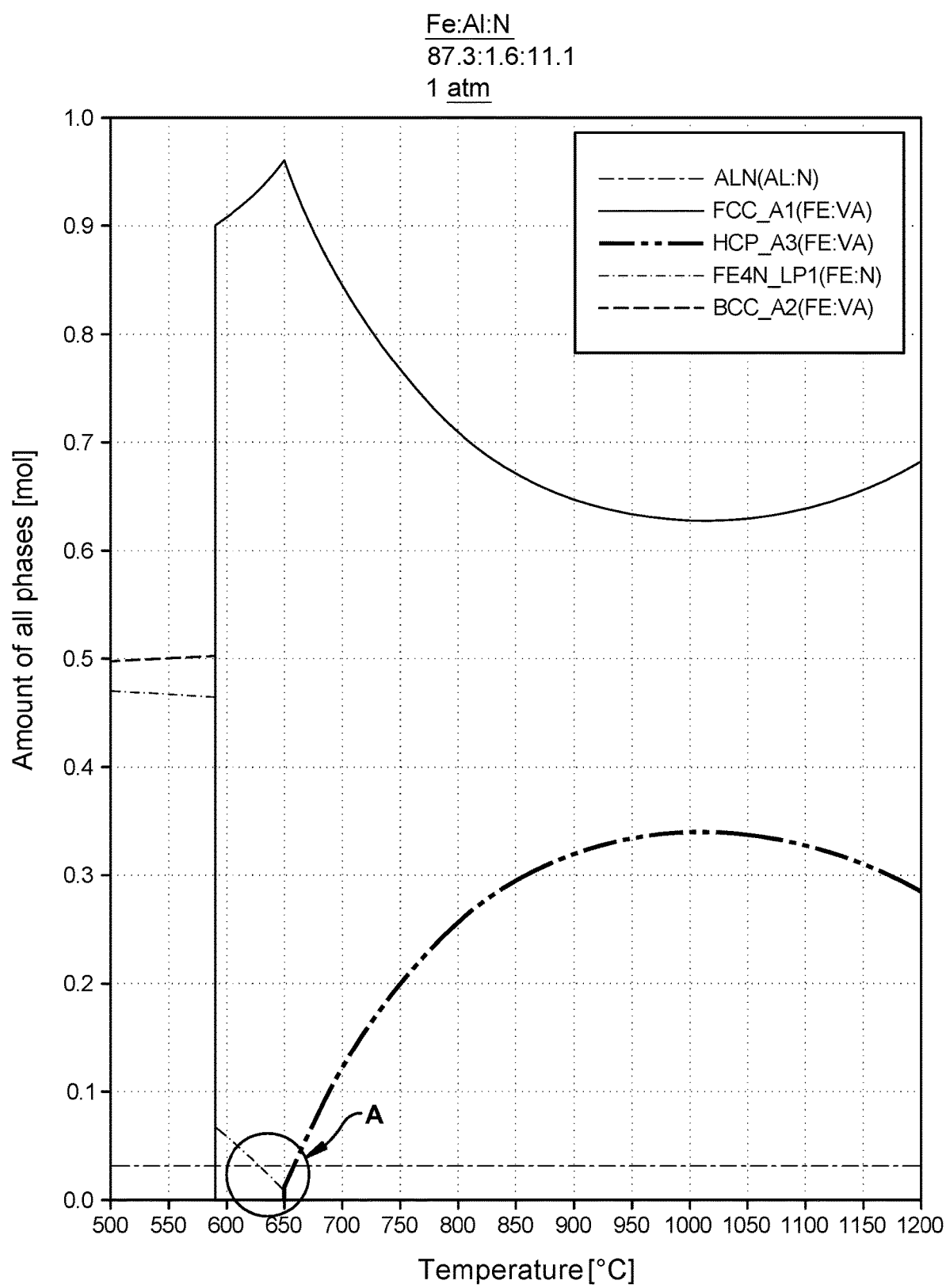
FIG. 13 shows the results of a CALPHAD calculation for an alloy composition of 87.3 at. % Fe—1.6 at. % Al—11.1 at. % N.
Figure 14:
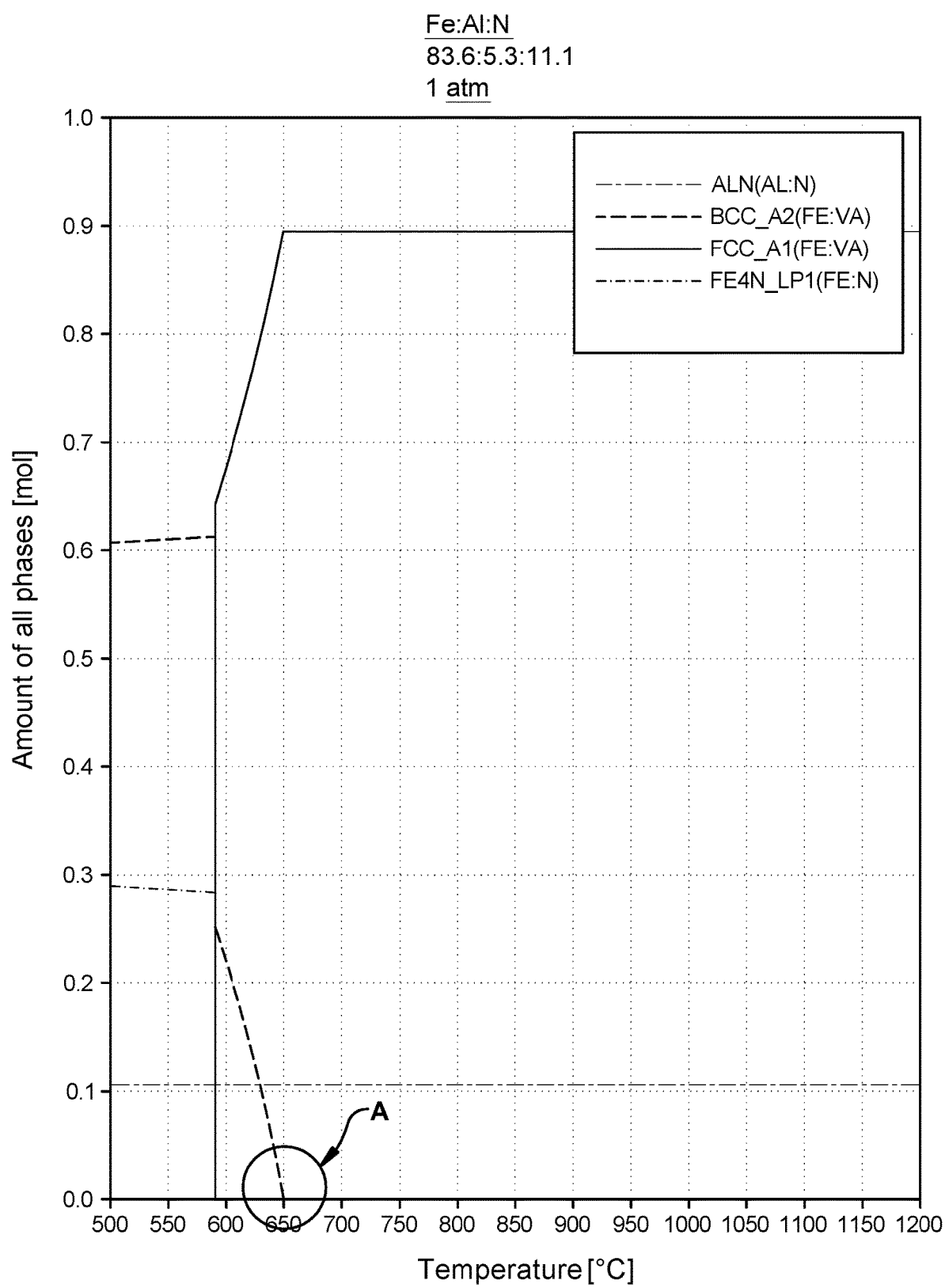
FIG. 14 shows the results of a CALPHAD calculation for an alloy composition of 83.6 at. % Fe—5.3 at. % Al—11.1 at. % N.

The calculations discussed above with reference to FIG. 11 apply to the remaining calculations illustrated in FIGS. 12-14.

FIG. 12 shows the results of the CALPHAD calculation at 5.2 at. % Al (e.g., 83.7 at. % Fe—5.2 at. % Al—11.1 at. % N). As shown in the highlighted region "A", at 5.2 at. % Al a single-phase (100%) γ-austenite having the desired 11.1 at. % N (line FCC_A1(FE:VA)) will form at temperatures greater than about 650° C., and below that temperature a thermodynamically stable alpha (ferrite) phase (line BCC_A2(FE:VA)) will form.

FIGS. 11 and 12 demonstrate that the compositional range of Al content that achieves single-phase γ-austenite is: 1.7 at. % Al 5.2 at. %, as is provided using the CALPHAD calculation disclosed in the application.

In order to demonstrate the criticality of the foregoing range of Al content, the CALPHAD calculations were run at Al levels below and above the above-mentioned range.

FIG. 13 shows the results of the CALPHAD calculation at 1.6 at. % Al (e.g., 87.3 at. % Fe—1.6 at. % Al—11.1 at. % N). As shown in the highlighted region "A", at 1.6 at. % Al the thermodynamically stable $Fe_4N$ phase (line FE4N_LP (FE:N)) will form at temperatures at or below 650° C., and the HCP epsilon phase (line HCP_A3(FE:VA)) will form at temperatures above 650° C. Therefore, a single-phase γ-austenite (line FCC_A1(FE:VA)) will not form at the 1.6 at. % Al content.

FIG. 14 shows the results of the CALPHAD calculation at 5.3 at. % Al (e.g., 83.6 at. % Fe—5.3 at. % Al—11.1 at. % N). As shown in the highlighted region "A", at 5.3 at. % Al the alpha (ferrite) phase (line BCC_A2(FE:VA)) extends beyond 650° C. Therefore, a single-phase γ-austenite (line FCC_A1(FE:VA)) will not form at 650° C. at the 5.3 at. % Al content.

In summary, the CALPHAD calculations shown in FIGS. 11-14 demonstrate that a range of 1.7 at. % Al 5.2 at. % exists for obtaining single-phase γ-austenite.

Calculation of the Range of Mn Content Using the CALPHAD Method

The CALPHAD method is used to calculate the range of Mn content in the Mn—Fe—N ternary system that achieves single-phase γ-austenite (i.e., 100% γ-Fe—Mn—N) having the desired 11.1 at. % nitrogen content. The calculations are run at a temperature range of greater than 600° C.

Figure 15:
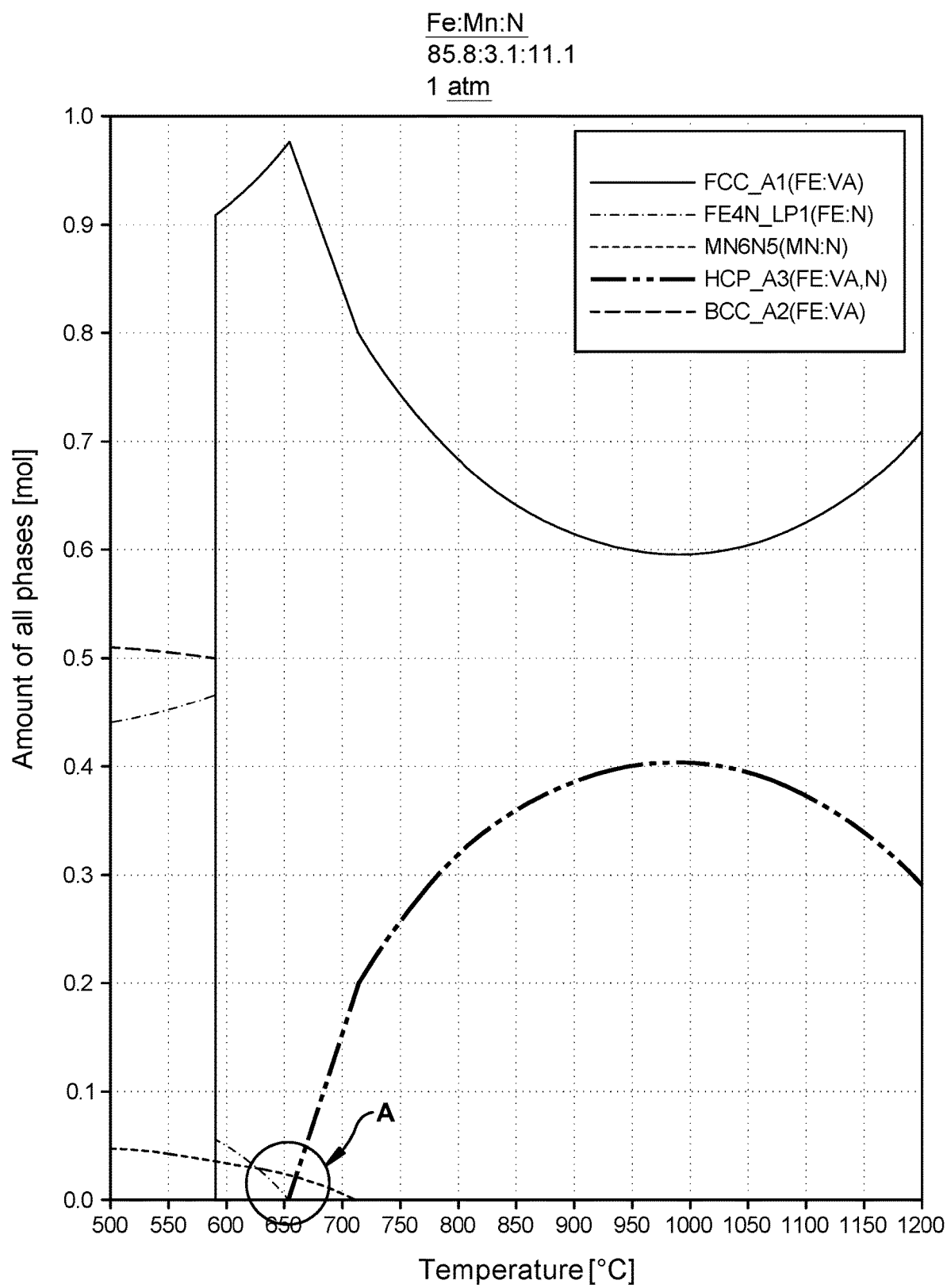
FIG. 15 shows the results of a CALPHAD calculation for an alloy composition of 85.8 at. % Fe—3.1 at. % Mn—11.1 at. % N.

FIG. 15 shows the results of the CALPHAD calculation at 3.1 at. % Mn (e.g., 85.8 at. % Fe—3.1 at. % Mn—11.1 at. % N). The desired γ-phase austenite is a face centered cubic (FCC) structure and is represented by the line FCC_A1(FE:VA). In showing whether single-phase (e.g., 100%) γ-austenite is formed, the FCC_A1(FE:VA) line is compared to the other phases illustrated in the diagram. In this case, at the highlighted region "A" of interest, the γ-austenite (FCC_A1 (FE:VA)) is present at around 650° C., but at this temperature the "MN6N5(MN:N)" phase also appears present, which is representative of a $Mn_6N_5$ phase. As similarly discussed above with respect to Cr and Al, it is known that Mn and N can form solid solutions with each other, but the $Mn_6N_5$ phase is kinetically suppressed during processing such that the $Mn_6N_5$ phase will not form. Accordingly, at 3.1 at. % Mn, a single-phase (100%) γ-austenite having the desired 11.1 at. % N (line FCC_A1(FE:VA)) will form at 650° C.

Figure 16:
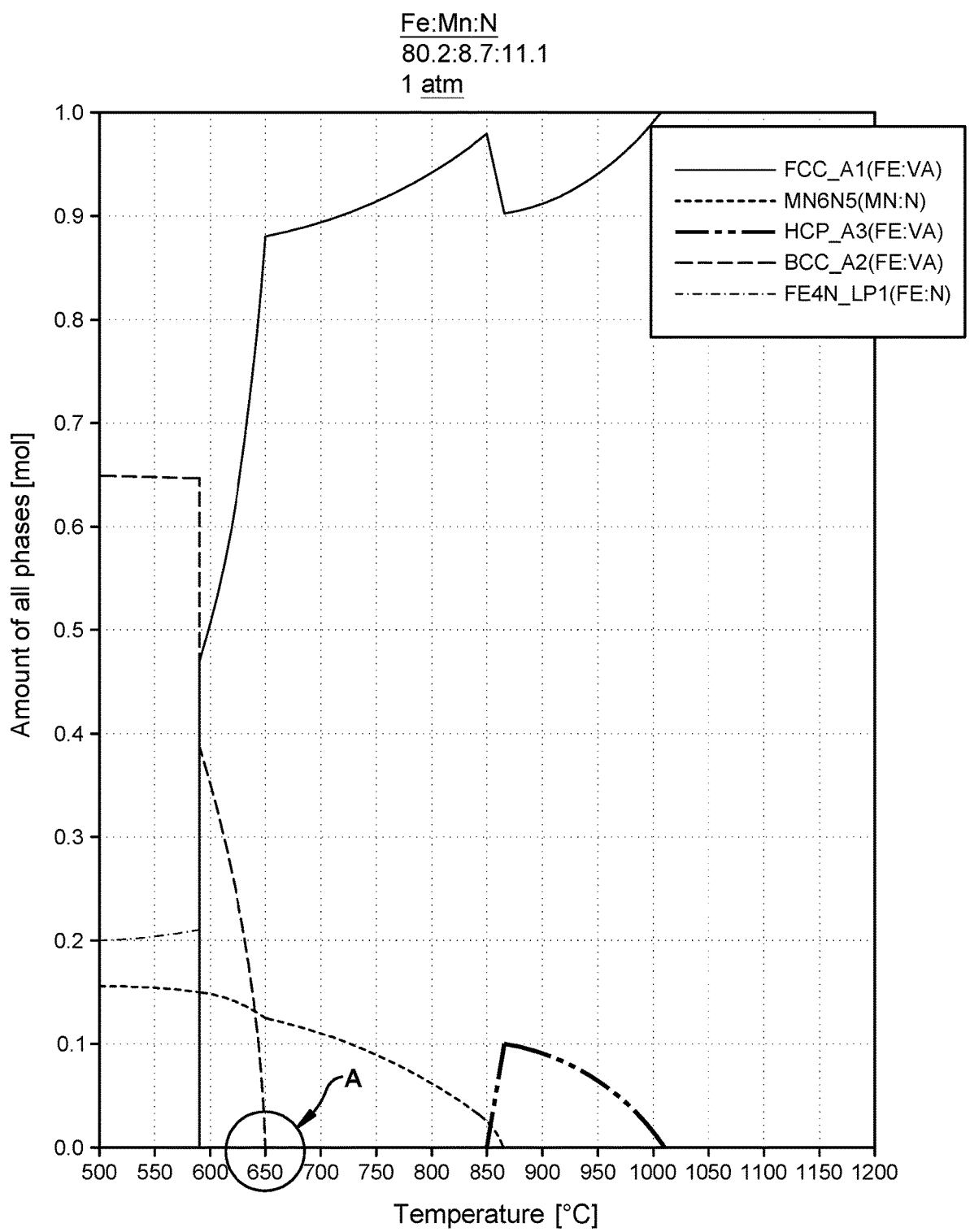
FIG. 16 shows the results of a CALPHAD calculation for an alloy composition of 80.2 at. % Fe—8.7 at. % Mn—11.1 at. % N.
Figure 17:
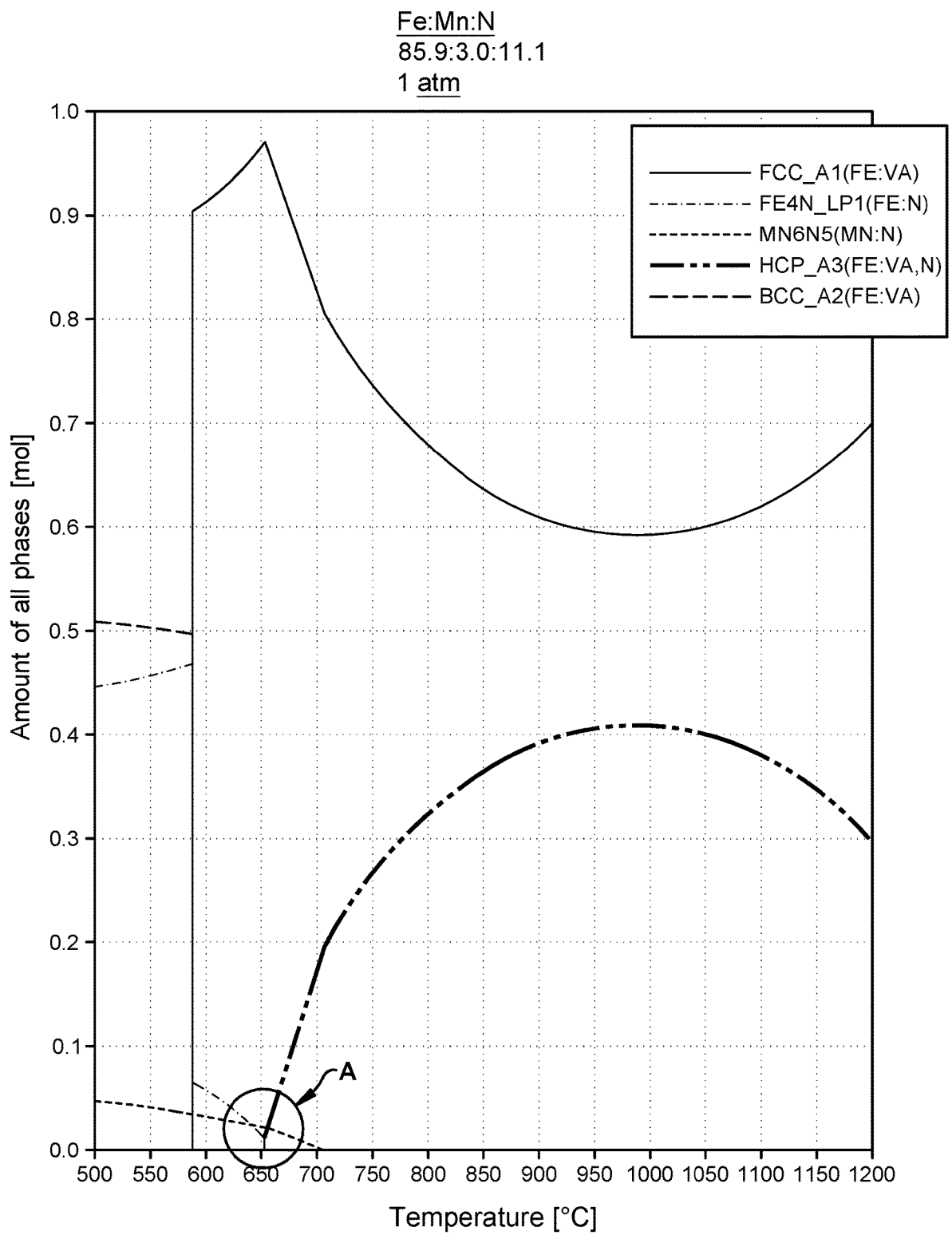
FIG. 17 shows the results of a CALPHAD calculation for an alloy composition of 85.9 at. % Fe—3.0 at. % Mn—11.1 at. % N.
Figure 18:
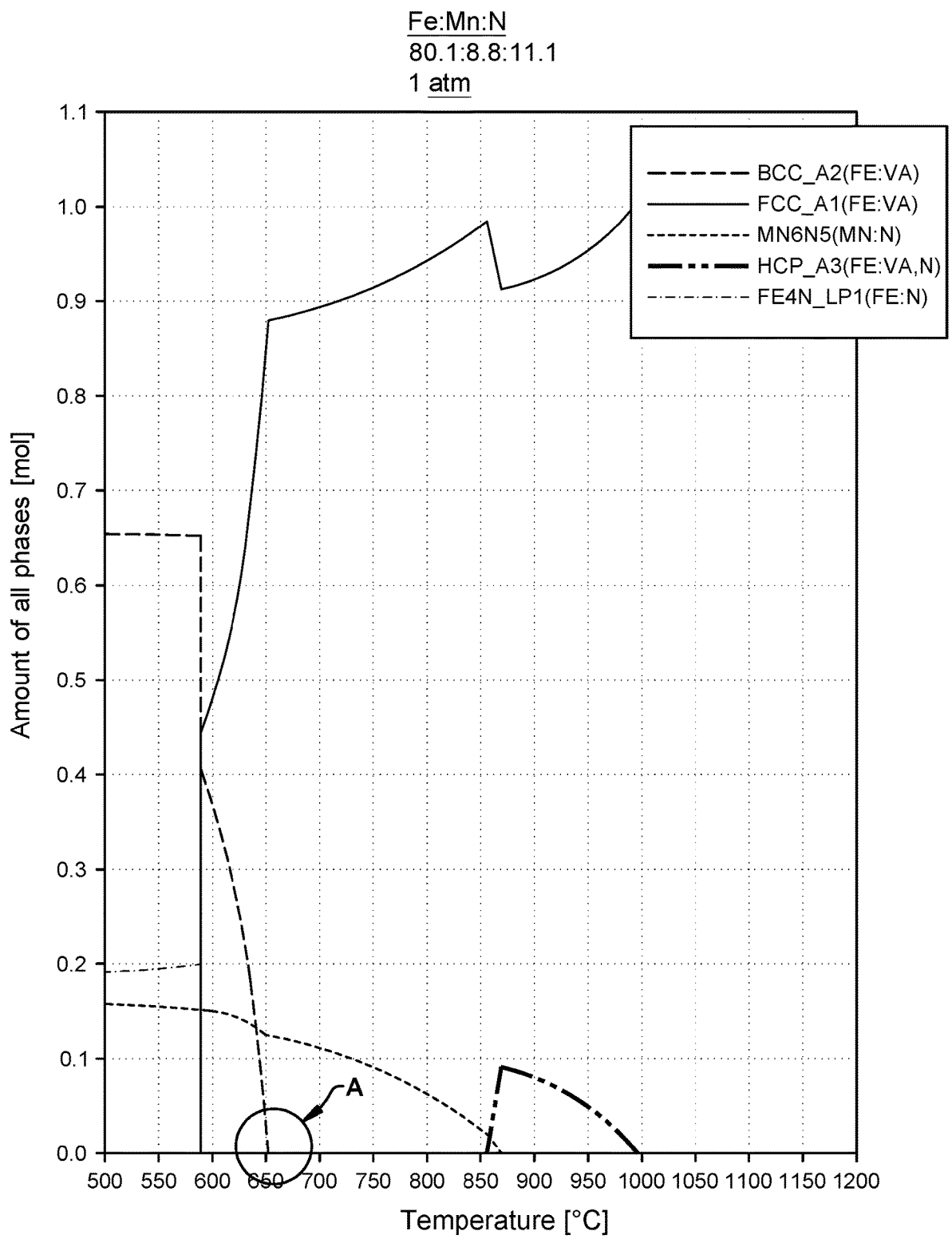
FIG. 18 shows the results of a CALPHAD calculation for an alloy composition of 80.1 at. % Fe—8.8 at. % Mn—11.1 at. % N.

The calculations discussed above with reference to FIG. 15 apply to the remaining calculations illustrated in FIGS. 16-18.

FIG. 16 shows the results of the CALPHAD calculation at 8.7 at. % Mn (e.g., 80.2 at. % Fe—8.7 at. % Mn—11.1 at. % N). As shown in the highlighted region "A", at 8.7 at. % Mn a single-phase (100%) γ-austenite having the desired 11.1 at. % N (line FCC_A1(FE:VA)) will form at temperatures greater than about 650° C., and below that temperature a thermodynamically stable alpha (ferrite) phase (line BCC_A2(FE:VA)) will form.

FIGS. 15 and 16 demonstrate that the compositional range of Mn content that achieves single-phase γ-austenite is: 3.1 at. %≤Mn≤8.7 at. %, as is provided using the CALPHAD calculation disclosed in the application.

In order to demonstrate the criticality of the foregoing range of Mn content, the CALPHAD calculations were run at Mn levels below and above the above-mentioned range.

FIG. 17 shows the results of the CALPHAD calculation at 3.0 at. % Mn (e.g., 85.9 at. % Fe—3.0 at. % Mn—11.1 at. % N). As shown in the highlighted region "A", at 3.0 at. % Mn the thermodynamically stable $Fe_4N$ phase (line FE4N_LP1(FE:N)) will form at temperatures at or below around 650° C., and the HCP epsilon phase (line HCP_A3 (FE:VA,N)) will form at temperatures above about 650° C. Therefore, a single-phase γ-austenite (line FCC_A1(FE: VA)) will not form at the 3.0 at. % Mn content.

FIG. 18 shows the results of the CALPHAD calculation at 8.8 at. % Mn (e.g., 80.1 at. % Fe—8.8 at. % Mn—11.1 at. % N). As shown in the highlighted region "A", at 8.8 at. % Mn the alpha (ferrite) phase (line BCC_A2(FE:VA)) extends beyond 650° C. Therefore, a single-phase γ-austenite (line FCC_A1(FE:VA)) will not form at 650° C. at the 8.8 at. % Mn content.

In summary, the CALPHAD calculations shown in FIGS. 15-18 demonstrate that a range of 3.1 at. %≤Mn≤8.7 at. % exists for obtaining single-phase γ-austenite. Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A material suitable for forming an ordered α"-martensitic iron-based alloy nitride permanent magnet, the material consisting essentially of a single-phase γ-austenite iron-based alloy nitride,
    wherein the single-phase γ-austenite iron-based alloy nitride has a composition consisting essentially of:
        nitrogen in a range from greater than 10.3 at. % to 11.1 at. %;
        an alloy element selected from the group consisting of:
            chromium in a range from 0.9 at. % to 2.7 at. %;
            manganese in a range from 3.1 at. % to 8.7 at. %; and
            aluminum in a range from 1.7 at. % to 5.2 at. %; and
        a balance of the composition is iron.

2. The material according to claim 1, wherein the nitrogen content is 11.1 at. %.

3. The material according to claim 1, wherein the single-phase γ-austenite iron-based alloy nitride is a single-phase solid solution having the nitrogen diffused interstitially in the lattice structure of the single-phase γ-austenite iron-based alloy nitride.

4. The material according to claim 1, wherein the nitrogen is included in the lattice structure of the single-phase γ-austenite iron-based alloy nitride at a ratio of 16:2 metal: nitrogen.

5. The material according to claim 1, wherein the alloy element is selected as chromium in the range from 0.9 at. % to 2.7 at. %.

6. The material according to claim 1, wherein the alloy element is selected as manganese in the range from 3.1 at. % to 8.7 at. %.

7. The material according to claim 1, wherein the alloy element is selected as aluminum in the range from 1.7 at. % to 5.2 at. %.

8. The material according to claim 1, wherein the material is in powder form.

9. A material suitable for forming an ordered α"-martensitic phase iron-based alloy nitride permanent magnet, the material consisting essentially of a single-phase γ-austenite iron-based alloy nitride, wherein the single-phase γ-austenite iron-based alloy nitride has an alloy composition comprising:
    nitrogen in the range from greater than 10.3 at. % to 11.1 at. %; and
    an alloying element selected from the group consisting of: chromium, aluminum, and manganese;
    wherein the alloying element is included in the alloy composition in an amount that enables the single-phase γ-austenite iron-based alloy nitride to be transformed to the ordered α"-martensitic phase iron-based alloy nitride permanent magnet.

10. The material according to claim 9, wherein the alloying element is chromium, and wherein the amount of the chromium present in the alloy composition is in a range from 0.9 at. % to 2.7 at. %.

11. The material according to claim 9, wherein the alloying element is manganese, and wherein the amount of the manganese present in the alloy composition is in a range from 3.1 at. % to 8.7 at. %.

12. The material according to claim 9, wherein the alloying element in the alloy composition is aluminum, and wherein the amount of the aluminum present in the alloy composition is in a range from 1.7 at. % to 5.2 at. %.

13. The material according to claim 9, wherein:
    the nitrogen content present in the alloy composition is 11.1 at. %;
    the alloying element present in the alloy composition is:
        chromium in a range from 0.9 at. % to 2.7 at. %;
        manganese in a range from 3.1 at. % to 8.7 at. %; or
        aluminum in a range from 1.7 at. % to 5.2 at. %; and
    a balance of the alloy composition is iron.

14. The material according to claim 1,
    wherein the material consists of the single-phase γ-austenite iron-based alloy nitride, and
    wherein the single-phase γ-austenite iron-based alloy nitride has a composition that consists of:
        nitrogen in a range from greater than 10.3 at. % to 11.1 at. %;
        an alloy element selected from the group consisting of:
            chromium in a range from 0.9 at. % to 2.7 at. %;
            manganese in a range from 3.1 at. % to 8.7 at. %; and aluminum in a range from 1.7 at. % to 5.2 at. %; and
a balance of the composition is iron.
15. The material according to claim 9,
wherein the material consists of the single-phase γ-austenite iron-based alloy nitride.

* * * * *